United States Patent
Hyun et al.

(10) Patent No.: US 12,436,640 B2
(45) Date of Patent: Oct. 7, 2025

(54) DISPLAY DEVICE

(71) Applicant: Samsung Display Co., Ltd., Yongin-Si (KR)

(72) Inventors: Changho Hyun, Yongin-si (KR); Taeun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/502,078

(22) Filed: Nov. 6, 2023

(65) Prior Publication Data

US 2024/0152229 A1 May 9, 2024

(30) Foreign Application Priority Data

Nov. 9, 2022 (KR) .................. 10-2022-0148969

(51) Int. Cl.
*G06F 3/041* (2006.01)
*H10K 59/40* (2023.01)

(52) U.S. Cl.
CPC .............. *G06F 3/04164* (2019.05); *G06F 2203/04105* (2013.01); *H10K 59/40* (2023.02)

(58) Field of Classification Search
CPC .. G06F 3/0416; G06F 3/04164; G06F 3/0414; G06F 3/04142; G06F 2119/14; H10K 59/40

See application file for complete search history.

(56) References Cited

U.S. PATENT DOCUMENTS

| | | | |
|---|---|---|---|
| 8,928,596 B2 | 1/2015 | Hayashi et al. | |
| 9,489,078 B2 | 11/2016 | Seo et al. | |
| 9,619,068 B2 | 4/2017 | Kim et al. | |
| 11,127,796 B2 * | 9/2021 | Lee | G06F 3/0412 |
| 2011/0242001 A1 * | 10/2011 | Zhang | G06F 3/044 |
| | | | 345/173 |
| 2020/0036122 A1 * | 1/2020 | Feng | H01R 13/6473 |
| 2020/0170106 A1 * | 5/2020 | Wu | H10K 59/179 |
| 2022/0011920 A1 * | 1/2022 | Shorten | G06F 3/044 |

FOREIGN PATENT DOCUMENTS

| | | | | |
|---|---|---|---|---|
| CN | 101978342 A | * | 2/2011 | .......... G06F 3/0445 |
| CN | 114067683 A | * | 2/2022 | .............. G09G 3/20 |
| CN | 114779960 A | * | 7/2022 | ............. G06F 3/041 |
| KR | 10-2010-0037544 A | | 4/2010 | |
| KR | 10-2016-0033986 A | | 3/2016 | |
| KR | 10-2014273 B1 | | 8/2019 | |
| KR | 10-2020-0115793 A | | 10/2020 | |
| KR | 20200115793 A | * | 10/2020 | ............... H05K 5/03 |

* cited by examiner

*Primary Examiner* — Matthew A Eason
*Assistant Examiner* — Scott D Au
(74) *Attorney, Agent, or Firm* — Innovation Counsel LLP

(57) ABSTRACT

Provided is a display device. The display device includes a display panel, a first cover arranged on a first surface of the display panel, a display circuit board connected to the first surface of the display panel, and a gasket arranged on a surface of the display circuit board connected to the display panel, wherein the gasket includes a signal input portion, and the display circuit board includes a sensor configured to sense a signal which varies according to a distance between the signal input portion and the sensor.

18 Claims, 12 Drawing Sheets

DISPLAY DEVICE

CROSS-REFERENCE TO RELATED APPLICATION

This application is based on and claims priority under 35 U.S.C. § 119 to Korean Patent Application No. 10-2022-0148969, filed on Nov. 9, 2022, in the Korean Intellectual Property Office, the disclosure of which is incorporated by reference herein in its entirety.

BACKGROUND

1. Field

One or more embodiments relate to a device, and more particularly, to a display device.

2. Description of the Related Art

Mobility-based electronic devices are widely used. As examples of such mobile electronic devices, tablet personal computer (PCs), in addition to compact electronic devices such as mobile phones, are widely used.

These mobile electronic devices include a display device that supports various functions and provides visual information such as images or pictures to users. Recently, as sizes of components for driving a display device have been reduced, a ratio of a display device in an electronic device has gradually increased, and a display device with a structure that is foldable to a certain angle in a flat state has been developed.

SUMMARY

A display device may include various structures to protect a rear side of a display panel. Pressure may be applied to fix the structures to the rear side of the display panel. In this case, a cover window which is arranged on a front side of the display panel or a display panel may be damaged which leads to a defective display device. One or more embodiments include a display device capable of precise measurement of applied pressure to prevent a damage of at least one of a display panel and a cover window.

Additional aspects will be set forth in part in the description that follows and, in part, will be apparent from the description, or may be learned by practice of the embodiments of the disclosure.

According to one or more embodiments, a display device includes a display panel, a first cover arranged on a first surface of the display panel, a display circuit board connected to the first surface of the display panel, and a gasket arranged on a surface of the display circuit board connected to the display panel, wherein the gasket includes a signal input portion, and wherein the display circuit board includes a sensor configured to sense a signal which varies according to a distance between the signal input portion and the sensor.

In the embodiment, the display circuit board may be bent.

In the embodiment, the signal input portion may include a connection portion, and a terminal portion connected to the connection portion and having a length or the distance between the signal input portion and the sensor that varies according to a pressure applied to the terminal portion.

In the embodiment, the terminal portion may extend vertically with respect to a surface of the connection portion.

In the embodiment, the terminal portion may include three or more terminal portions, and wherein the three or more terminal portions may be arranged radially with respect to one of the three or more terminal portions.

In the embodiment, the terminal portion may include a plurality of terminal portions, and a length of one terminal portion of the plurality of terminal portions may be different from a length of another terminal portion of the plurality of terminal portions.

In the embodiment, the sensor may include a first wire and a second wire arranged to intersect the first wire.

In the embodiment, at least one of the first wire and the second wire may include a plurality of wires, and wherein the first wire and the second wire may intersect at a plurality of areas.

In the embodiment, the display device may further include a panel protection layer arranged between the display panel and the display circuit board.

In the embodiment, the display device may further include a bracket coupled to the display panel.

According to one or more embodiments, a display device includes a bracket, a display panel coupled to the bracket and including a substrate and a display layer arranged on the substrate, a display circuit board connected to the display panel and arranged on a rear surface of the substrate, and a gasket arranged between the display circuit board and the bracket, wherein the display circuit board includes a sensor configured to sense a signal that varies according to a height of the gasket.

In the embodiment, the display device may further include a cover arranged on the display panel.

In the embodiment, in a plan view, an edge of the cover may be arranged outside of an edge of the display layer.

In the embodiment, the gasket may include a gasket body portion, a connection portion arranged on a surface of the gasket body portion, and a terminal portion inserted into the gasket body portion and connected to the connection portion.

In the embodiment, the terminal portion may include a plurality of terminal portions, and wherein a length of one terminal portion of the plurality of terminal portions may be different from a length of another terminal portion of the plurality of terminal portions.

In the embodiment, the terminal portion may extend in a vertical direction from the connection portion.

In the embodiment, the sensor may include a first wire and a second wire arranged to intersect the first wire.

In the embodiment, each of the first wire and the second wire may include a plurality of wires, and wherein intersections between the first wire and the second wire may be arranged to be spaced apart from each other.

In the embodiment, the first wire and the second wire may be electrically insulated from each other.

In the embodiment, the display device may further include a panel protection layer arranged between the substrate and the display circuit board.

Other aspects, features, and advantages of the disclosure will become more apparent from the drawings, the claims, and the detailed description.

Such general and specific aspects may be implemented by using a system, a method, a computer program, or any combination thereof.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
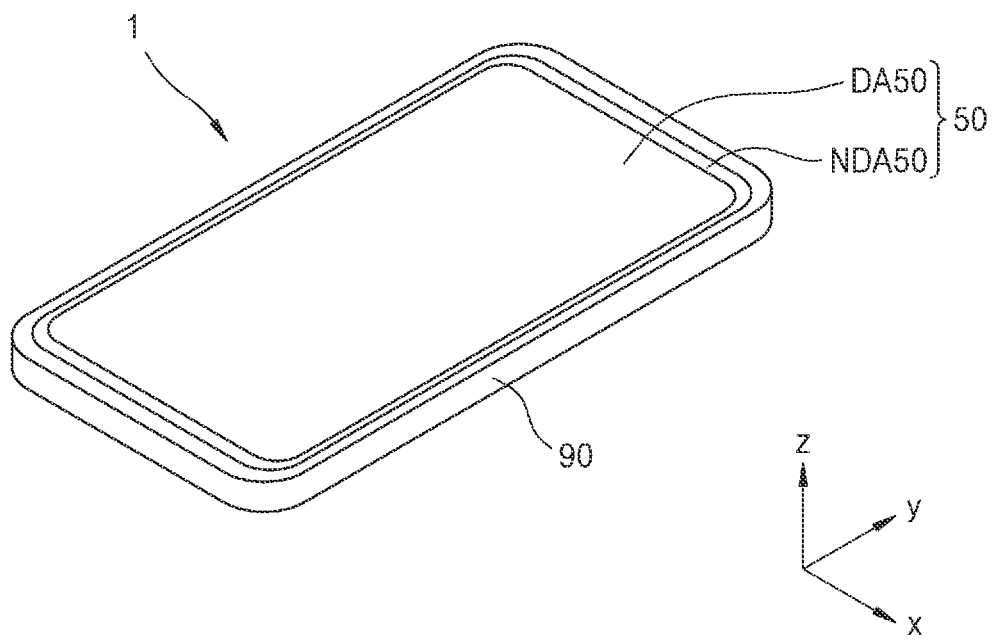
FIG. 1 is a perspective view schematically illustrating a display device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b and c" indicates only a, only b, only c, both a and b, both a and c, both b and c, all of a, b, and c, or variations thereof.

The disclosure may include various embodiments and modifications, and certain embodiments thereof are illustrated in the drawings and will be described herein in detail. The effects and features of the disclosure and the accomplishing methods thereof will become apparent from the embodiments described below in detail with reference to the accompanying drawings. However, the disclosure is not limited to the embodiments described below and may be embodied in various modes.

Reference will now be made in detail to embodiments, examples of which are illustrated in the accompanying drawings, and in the drawings, the same elements are denoted by the same reference numerals and a repeated explanation will be omitted.

It will be understood that although terms such as "first" and "second" may be used herein to describe various components, these components should not be limited by these terms and these terms are only used to distinguish one component from another component.

As used herein, the singular forms "a", "an", and "the" are intended to include the plural forms as well, unless the context clearly indicates otherwise.

Also, it will be understood that the terms "comprise," "include," and "have" used herein specify the presence of stated features or components, but do not preclude the presence or addition of one or more other features or components.

It will be understood that when a layer, region, or component is referred to as being "on" another layer, region, or component, it may be "directly on" the other layer, region, or component or may be "indirectly on" the other layer, region, or component with one or more intervening layers, regions, or components therebetween.

Sizes of components in the drawings may be exaggerated for convenience of description. In other words, since sizes and thicknesses of components in the drawings are arbitrarily illustrated for convenience of explanation, the following embodiments are not limited thereto.

In the following embodiments, the x-axis (or x direction), the y-axis (or y direction) and the z-axis (or z direction) are not limited to three axes of the rectangular coordinate system, and may be interpreted in a broader sense. For example, the x-axis (or x direction), the y-axis (or y direction), and the z-axis (or z direction) may be perpendicular to one another, or may represent different directions that are not perpendicular to one another.

When a certain embodiment may be implemented differently, a specific process order may be performed differently from the described order. For example, two processes described in succession may be performed substantially simultaneously, or may be performed in an order opposite to that described.

Figure 2:
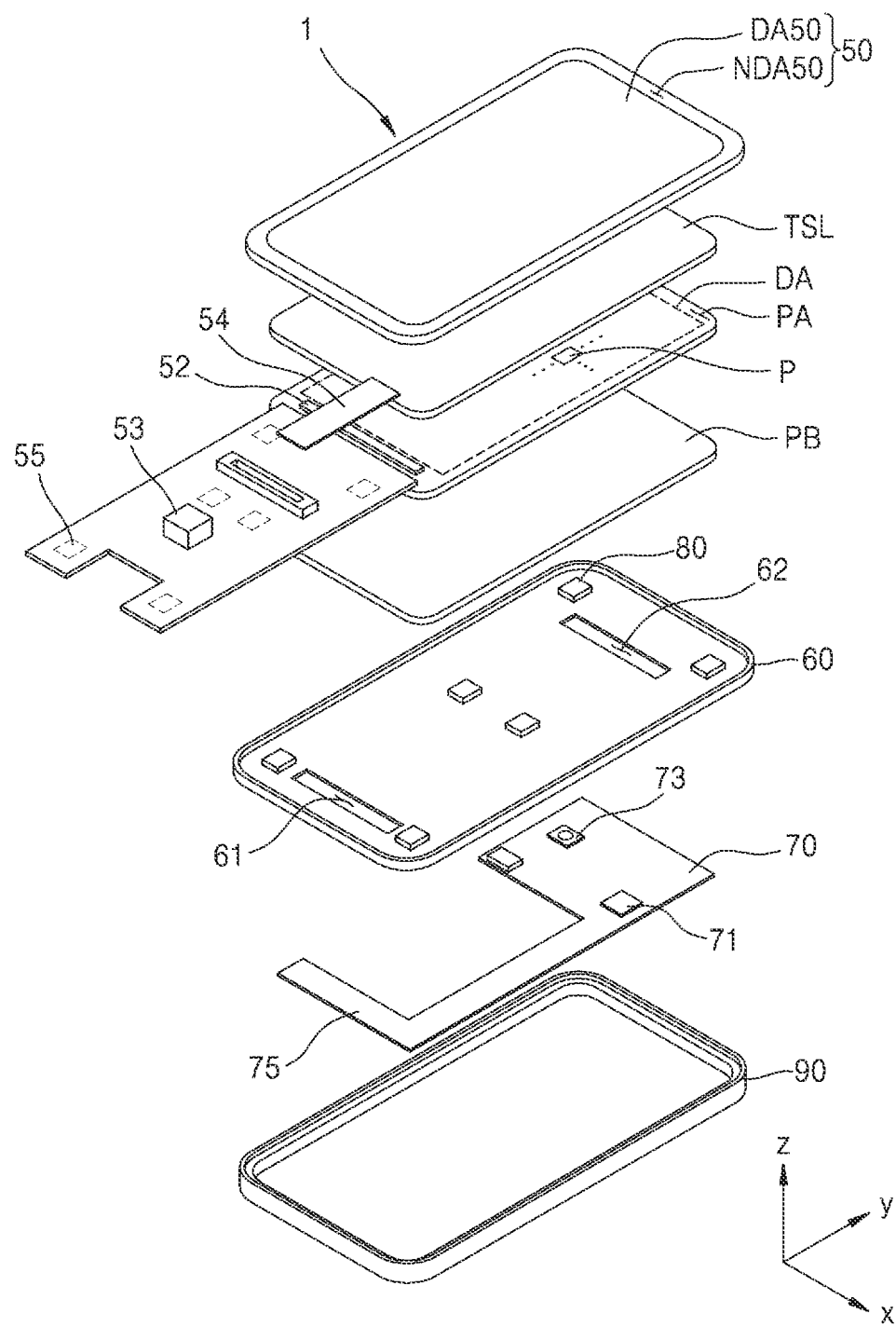
FIG. 2 is an exploded perspective view schematically illustrating the display device of FIG. 1.
Figure 3:
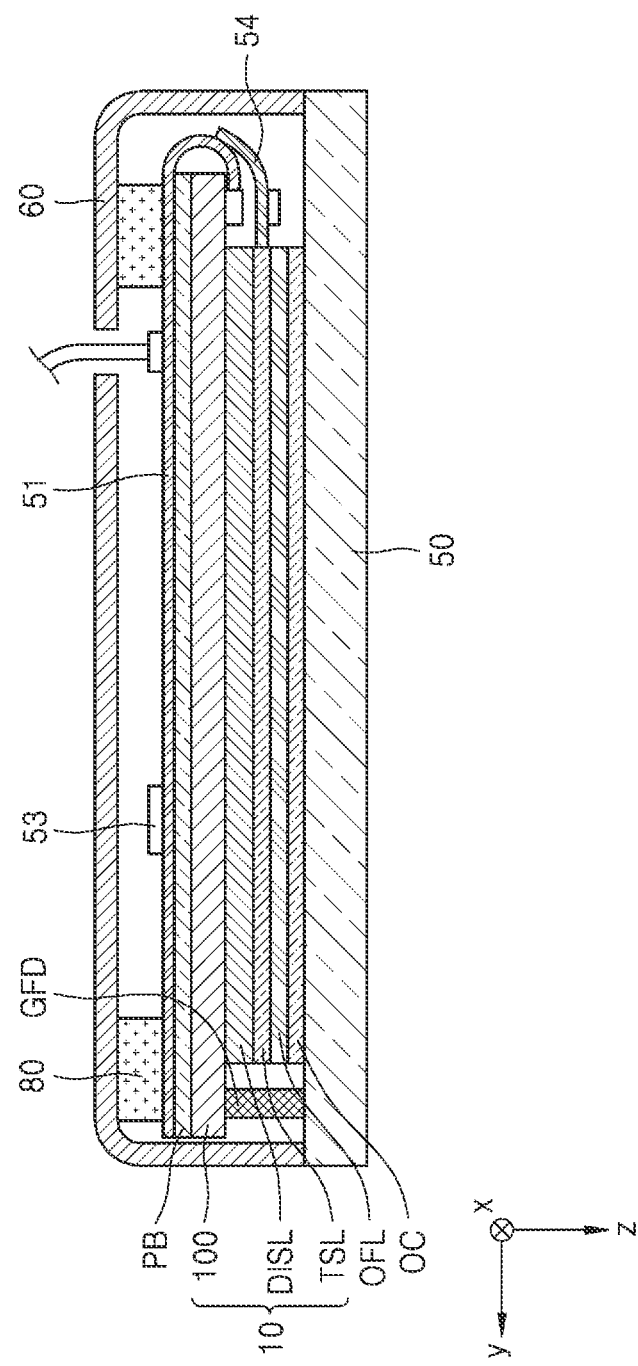
FIG. 3 is a cross-sectional view schematically illustrating a part of the display device of FIG. 1.

FIG. 1 is a perspective view schematically illustrating a display device according to an embodiment. FIG. 2 is an exploded perspective view schematically illustrating the display device of FIG. 1. FIG. 3 is a cross-sectional view schematically illustrating a part of the display device of FIG. 1.

Referring to FIGS. 1, 2 and 3, a display device 1 is a device displaying a moving image or a still image, and may be used not only as a display screen of portable electronic devices such as a mobile phone, a smartphone, a tablet PC, a mobile communication terminal, a personal digital assistant (PDA), an electronic book, a portable multimedia player (PMP), a navigation device, or a ultra-mobile PC, but also as a display screen of other various products such as TVs, laptop computers, monitors, billboards, internet of things (IoT) device or the like. Also, the display device 1 may be used in a wearable device such as a smartwatch, a watch phone, a glasses-type display, or a head-mounted display (HMD). In addition, the display device 1 may be used as a display in an instrument panel of a vehicle, a center information display (CID) arranged on a center fascia or a dashboard of a vehicle, a room mirror display for replacing side-view mirrors of a vehicle, or a display arranged on a rear surface of a front seat for providing entertainment content to a passenger in a back seat of a vehicle.

The display device 1 may include a cover 50, a display panel 10, a display circuit board 51, a bracket 60, a gasket 80, and a lower cover 90.

The cover 50 may be arranged on the display panel 10. In an embodiment, the display panel 10 may be parallel to the plane defined by the x and y directions. In an embodiment, the cover 50 may cover an upper surface of the display panel 10. Accordingly, the cover 50 may protect the upper surface of the display panel 10.

In an embodiment, the cover 50 may include a transmissive cover portion DA50 through which an image is displayed and a light-shielding cover portion NDA50 through which the image is not displayed. The light-shielding cover portion NDA50 may include an opaque material that shields light. The light-shielding cover portion NDA50 may protect a pattern which may be shown to a user when an image is not displayed from being viewed by a user.

The display panel 10 may be arranged under the cover 50. A display area DA of the display panel 10 and the transmissive cover portion DA50 of the cover 50 may overlap each other in a plan view.

In an embodiment, although it is not shown in the drawings, the cover 50 may include a cover window (not shown) and a protective layer (not shown). In an embodiment, the cover window may include a transparent material. The cover window may include glass, a transparent synthetic resin, etc. The cover window may include at least one layer.

In an embodiment, the protective layer may be arranged on an upper surface of the cover window and may prevent or minimize scratches, etc. on the cover window. Although it is not shown in the drawings, in an embodiment, an opaque layer may be arranged at a part of the protective layer. In an embodiment, the opaque layer may be arranged at an edge of the protective layer. The opaque layer may block light and may be arranged at the light-shielding cover portion NDA50 of the cover 50.

The display panel 10 may include the display area DA where an image is displayed and a peripheral area PA arranged around the display area DA. Subpixels P having display elements may be arranged in the display area DA. There may be a plurality of subpixels P, and the plurality of subpixels P may be arranged to be spaced apart from each other. A part of the plurality of subpixels P, another part of the plurality of subpixels P, and yet another part of the plurality of subpixels P may emit light of different colors from each other. The display device 1 may provide an image by using light emitted from the subpixels P arranged in the display area DA, and the peripheral area PA may be a non-display area where the subpixels P are not arranged.

The display panel 10 may display (output) information processed by the display device 1. As an example, the display panel 10 may display information, user interface (UI), or graphical user interface (GUI) processed by the display device 1. The display panel 10 may include a display layer DISL displaying an image and a touch screen layer TSL sensing a touch input by a user. Accordingly, the display panel 10 may serve as one of input devices providing an input interface between the display device 1 and a user, and simultaneously, serve as one of output devices providing an output interface between the display device 1 and a user.

In the following description, although an organic light-emitting display device is described as an example of the display device 1 according to an embodiment, the display device 1 of the disclosure is not limited thereto. In an embodiment, the display device 1 may be an inorganic light-emitting display (or an inorganic EL display) device, a quantum dot light-emitting display device, or the like. For example, an emission layer of a display element included in the display device 1 may include an organic material, an inorganic material, quantum dots, an organic material and quantum dots, or an inorganic material and quantum dots.

In an embodiment, the display panel 10 may be a flexible display panel that has flexibility so as to be easily bendable, foldable, or rollable. For example, the display panel 10 may include a foldable display panel that is foldable and unfoldable, a curved display panel having a curved display surface, a bendable display panel in which an area other than a display surface is bendable, a rollable display panel that is rollable, and a stretchable display panel that is stretchable. In an embodiment, the display panel 10 may include a rigid display panel that has rigidity so as not to be easily bent.

A support member GFD may be arranged between the display panel 10 and the cover 50. The support member GFD may not only support the cover 50 but also prevent damage of at least one of the display panel 10 and the cover 50 when the bracket 60 or the lower cover 90 is coupled thereto. The support member GFD may include a glass fiber, an organic material, etc.

The display panel 10 may be arranged under the cover 50. In an embodiment, the display panel 10 may be connected to the display circuit board 51 through a first flexible film (not shown). An anisotropic conductive film may be arranged between the display panel 10 and the first flexible film and between the display circuit board 51 and the first flexible film. In another embodiment, the display panel 10 may be connected with the display circuit board 51 by the anisotropic conductive film. Hereinafter, the embodiments are described focusing on the case where the display panel 10 and the display circuit board 51 are connected to each other through the anisotropic conductive film for convenient explanation.

A touch sensor driving portion 53 may be arranged on the display circuit board 51. In an embodiment, a display driving portion 52 may be arranged directly on a substrate 100 of the display panel 10. In another embodiment, although it is not shown in the drawings, the display driving portion 52 may be arranged on the display circuit board 51. In another embodiment, although it is not shown in the drawings, the display driving portion 52 may be arranged on a flexible film (not shown). Hereinafter, the embodiments are described focusing on the case where the display driving portion 52 is arranged directly on the substrate 100 of the display panel 10 for convenient explanation.

At least a part of the substrate 100 of the display panel 10, the display circuit board 51, or the first flexible film may be bent. When the substrate 100 is bent, a bending protection layer (not shown) may be arranged at a bent portion of the substrate 100 to prevent a crack, etc. of the substrate 100. The bending protection layer may include a polymer resin such as polyethyleneterephthalate (PET), polyimide (PI) etc.

In an embodiment, the display device 1 may include a functional layer OFL arranged on the display panel 10 and a panel protecting layer PB arranged under the display panel 10. The functional layer OFL may be arranged between the cover 50 and the display panel 10. In addition, the display device 1 may include a touch screen layer TSL arranged on the display panel 10 and receiving a touch signal from a user.

The touch screen layer TSL may be formed in a panel shape or a film shape. Or the touch screen layer TSL may be integrated with the display panel 10. For example, when the touch screen layer TSL is formed in a film shape, the touch screen layer TSL may be integrated with a thin film encapsulation layer TFE (see FIG. 8) for encapsulating the display panel 10.

In another embodiment, the touch screen layer TSL may include electrode patterns disposed on the display panel 10. In this case, the electrode patterns may be arranged to intersect each other on the thin film encapsulation layer TFE, and a change in capacitance that varies according to a touch of a user may be measured at an intersection between the electrode patterns.

A touch circuit board 54 may be attached to one side of the touch screen layer TSL. More specifically, the touch circuit board 54 may be attached to pads arranged on one side of the touch screen layer TSL by using the anisotropic conductive film. In addition, a touch connection portion may be arranged at the touch circuit board 54, and the touch connection portion may be connected to a connector of the display circuit board 51. The touch circuit board 54 may be a flexible printed circuit board or a chip on film. In another embodiment, the touch circuit board 54 may be integrated with the touch screen layer TSL. In this case, the touch circuit board 54 may have a shape of wire and be connected to a pad portion arranged at the display panel 10.

A touch driving portion 53 may apply touch driving signals to the touch screen layer TSL, sense first sensing signals sensed from the touch screen layer TSL, and calculate a touch position of a user by analyzing the first sensing signals. Moreover, the touch driving portion 53 may apply touch driving signals to a sensor (not shown), sense second sensing signals sensed from the sensor, and calculate a touch position of a signal input portion (not shown) by analyzing the second sensing signals.

In an embodiment, although it is not shown in the drawings, the touch driving portion 53 may be formed as an integrated circuit and be formed on the touch circuit board 54. In another embodiment, the touch driving portion 53 may be arranged on the display circuit board 51. In this case, the touch circuit board 54 may be connected to the display circuit board 51 or to the display panel 10. Hereinafter, the embodiments are described in detail focusing on the case where the touch driving portion 53 is arranged on the display circuit board 51, and the touch circuit board 54 connects the touch screen layer TSL to the display circuit board 51.

In an embodiment, the functional layer OFL may be arranged on the touch screen layer TSL. The functional layer OFL may include an anti-reflection layer. The anti-reflection layer may reduce a reflectivity of light (external light) incident from the outside to the display device 1.

In some embodiments, the anti-reflection layer may include a polarization film. The polarization film may include a linear polarization plate and a phase delay film such as a quarter-wave ($\lambda/4$) plate. The phase delay film may be arranged on the touch screen layer, and the linear polarization plate may be arranged on the phase delay film.

According to an embodiment, the anti-reflection layer may include a filter layer including a black matrix and color filters. The color filters may be arranged by taking into account the colors of light respectively emitted by the subpixels of the display device 1. For example, the filter layer may include a color filter of a red, green, or blue color. In this case, the display panel 10 may include the filter layer. The filter layer may be arranged on the touch screen layer TSL of the display device 1 without an additional adhesive layer.

According to an embodiment, the anti-reflection layer may include a destructive interference structure. The destructive interference structure may include a first reflective layer and a second reflective layer arranged on different layers from each other. First reflected light and second reflected light respectively reflected by the first reflective layer and the second reflective layer may undergo destructive interference, thereby reducing external light reflectance.

In an embodiment, the functional layer OFL may further include a shock absorption layer. The shock absorption layer may protect a structure such as a display panel disposed thereunder, etc. from external shock. In an embodiment, the shock absorption layer may be a polymer film. The polymer film may include at least one of polyEthylene terephthalate (PET), polyethylene naphthalate (PEN), polyether sulfone (PES), polylmide (PI), polyarylate (PAR), polycarbonate (PC), polymethyl methacrylate (PMMA), and cycloolefin copolymer (COC) resin.

In an embodiment, the functional layer OFL may include an anti-reflection layer and a shock absorption layer. The anti-reflection layer and the shock absorption layer may be sequentially stacked on the display panel 10 or the touch screen layer TSL. Hereinafter, the embodiments are described focusing on the case where the functional layer OFL includes a polarization film as an anti-reflection layer for convenient explanation.

An adhesive may be arranged between the functional layer OFL and the display panel 10. The adhesive may attach the functional layer OFL to the display panel 10. The adhesive may be a transparent adhesive such as a pressure sensitive adhesive (PSA) or an optical clear adhesive (OCA). The functional layer OFL may be arranged directly on the display panel 10 or the touch screen layer TSL.

The cover 50 may be arranged on the functional layer OFL. The cover 50 may be attached onto the functional layer OFL by the adhesive OC. In an embodiment, the adhesive OC may be a transparent adhesive such as a pressure sensitive adhesive (PSA) or an optical clear adhesive (OCA).

In an embodiment, a panel protecting layer PB may be arranged below the display panel 10. The panel protecting layer PB may absorb shock applied from the outside to the display device 1. The panel protecting layer PB may be attached under the display panel 10 by a PSA. However, the disclosure is not limited thereto.

The display circuit board 51 may be attached to one side of the display panel 10. More specifically, the display circuit board 51 may be attached to the pads arranged on one side of the display panel 10 by using the anisotropic conductive film.

The touch circuit board 54 and the display circuit board 51 may be bent from an upper portion of the display panel 10 towards a lower portion of the display panel 10. The display circuit board 51 may be connected to the touch connection portion of the touch circuit board 54 through the connector. Alternatively, the display circuit board 51 may include, instead of the connector, pads corresponding to the connector, and in this case, the display circuit board 51 may be connected to the touch circuit board 54 by using the anisotropic conductive films. The display circuit board 51 may be connected to a main circuit board 70 through a display connection portion (not shown).

The bracket 60 may be arranged under the display panel 10 to support the display panel 10. The bracket 60 may include a plastic, a metal or both a plastic and a metal. The bracket 60 may include a connector hole 61 through which the connector passes. Moreover, the bracket 60 may include a camera hole 62 into which a camera device 73 is inserted.

The main circuit board 70 may be provided separately from the display circuit board 51 or be integrated with the display circuit board 51. When the main circuit board 70 is provided separately from the display circuit board 51, the main circuit board 70 and the display circuit board 51 may be connected to each other by a cable, etc. Hereinafter, the embodiments are described focusing on the case where the main circuit board 70 is provided separately from the display circuit board 51 for convenient explanation.

The main circuit board 70 may include a main processor 71, the camera device 73, a main connector 75, and components (not shown). The main processor 71 may be formed as an integrated circuit. The camera device 73 may be arranged on both of an upper surface and a lower surface of the main circuit board 70, and each of the main processor 71 and the main connector 75 may be arranged on any one surface of the upper surface and the lower surface of the main circuit board 70.

The main processor 71 may control all functions of the display device 1. For example, the main processor 71 may output digital video data to the display driving portion 52 through the display circuit board 51 such that the display panel 10 displays an image. Moreover, the main processor 71 may receive sensing data from the touch sensor driving portion 53. The main processor 71 may determine whether a user touch is input according to the sensing data and execute an operation corresponding to a direct or indirect touch by a user. For example, the main processor 71 may analyze the sensing data to calculate a touch coordinate of the user touch, and then execute an application indicated by an icon touched by the user or perform an operation. The main processor 71 may be an application processor, a central processing unit, or a system chip, which includes an integrated circuit.

The camera device 73 may process image frames of a still image, a video, etc. obtained by an image sensor in a camera mode and output the result to the main processor 71. The camera device 73 may include at least one of a camera sensor (for example, CCD, CMOS, etc.), a photo sensor (or image sensor), and a laser sensor. The camera device 73 may be connected to an image sensor of the components arranged to overlap a component area and process an image input to the image sensor.

A cable passing through a connector hole 61 of the bracket 60 may be connected to the main connector 75, and accordingly, the main circuit board 70 may be electrically connected to the display circuit board 51.

The main circuit board 70 may further include at least one wireless communication portion, at least one input portion, at least one sensor portion, at least one output portion, at least one interface portion, a memory, and a power supply portion, in addition to the main processor 71, the camera device 73, and the main connector 75.

The wireless communication portion may include at least one of a broadcast receiving module, a mobile communication module, a wireless internet module, a short range communication module, and a location information module.

The broadcast receiving module may receive a broadcast signal and/or information regarding broadcasting from an external broadcast management server through a broadcasting channel. The broadcasting channel may include a satellite channel and a terrestrial channel.

The mobile communication module may receive and transmit a wireless signal with at least one of a base station, an external terminal, and a server on a mobile communication network according to technology standards or communication methods for mobile communication, such as a global system for mobile communication (GSM), code division multi access (CDMA), code division multi access (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), etc. The wireless signal may include a voice call signal, a video call signal, or data in various forms according to receipt and transmission of text/multimedia message.

The wireless internet module may refer to a module for wireless internet connection. The wireless internet module may be configured to receive and transmit a wireless signal on a communication network according to wireless internet technologies. Wireless internet technologies may include, for example, wireless local area network (WLAN), wireless-fidelity (Wi-Fi), Wi-Fi direct, digital living network alliance (DLNA), etc.

The short range communication module may be for short range communication and may support short range communication by using at least one of Bluetooth®, radio frequency identification (RFID), infrared data association (IrDA), ultra wideband (UWB), ZigBee, near field communication (NFC), Wi-Fi, Wi-Fi direct, and wireless universal serial bus (USB) technologies. The short range communication module may support wireless communication between the display device 1 and a wireless communication system, between the display device 1 and another electronic device, or between the display device 1 and a network on which another electronic device (or external server) is arranged through wireless area networks. The wireless area networks may be wireless personal area networks. Another electronic device may be wearable device which may interchange data or be connected with the display device 1.

The location information module may be a module configured to obtain a location (or current location) of the display device 1 and typical examples thereof may include a global positioning system (GPS) module and/or a Wi-Fi module. For example, with the help of the GPS module, the display device 1 may obtain a location of the display device 1 by using a signal transmitted from a GPS satellite. Moreover, by means of the Wi-Fi module, the display device 1 may obtain a location of the display device 1 based on information of a wireless access point (AP) which receives and transmits a wireless signal with the Wi-Fi module. The location information module may be a module used to obtain a location (or current location) of the display device 1, and is not limited to a module configured to directly calculate or obtain a location of the display device 1.

The input portion may include an image input portion such as the aforementioned camera device, an audio input portion such as a microphone for audio signal input, and an input device for receiving information from a user.

The camera device 73 may process image frames of a still image, a video, etc. obtained by an image sensor in a video call mode or an imaging mode. The processed image frames may be displayed on the display panel 10 or may be stored in the memory.

The microphone may process an external sound signal into electrical audio data. The processed audio data may be used in various ways according to a function being performed in the display device 1 (or a running application). In the microphone, various noise removing algorithms to remove noise generated in the process of receiving the external sound signal may be implemented.

The main processor 71 may control operations of the display device 1 in correspondence with information input through an input device. The input device may include a mechanical input tool such as a button, a dome switch, a jog wheel, etc. which are located on a rear surface or a lateral surface of the display device 1, or a touch input tool. The touch input tool may include a touch screen layer of the display panel 10.

The sensor portion may include at least one sensor configured to sense at least one of information within the display device 1, surrounding information around the display device 1 and user information and generate a sensing signal corresponding thereto. The main processor may control driving or operation of the display device 1 based on the sensing signal or perform data processing, a function or an operation in relation to an application installed in the display device 1. The sensor portion may include at least one of a proximity sensor, an illumination sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor, a battery gauge, an environment sensor (e.g., a barometer, a hygrometer, a thermometer, a radioactivity sensing sensor, a heat sensing sensor, a gas sensing sensor, etc.), and a chemical sensor (e.g., an electronic nose, a healthcare sensor, a biometric sensor, etc.).

The proximity sensor may refer to a sensor configured to detect an object approaching a detection surface or whether an object exists nearby without a mechanical contact by using a force of an electromagnetic field or infrared light, etc. Examples of the proximity sensor include a transmission-type photoelectronic sensor, a direct reflection-type photoelectronic sensor, a mirror reflection-type photoelectronic sensor, a high-frequency oscillation-type proximity sensor, a capacitance-type proximity sensor, a magnetic proximity sensor, an infrared proximity sensor, etc. The proximity sensor may sense not only a proximity touch but also a proximity touch pattern such as a proximity touch direction, a proximity touch speed, a proximity touch time, a proximity touch position, and a proximity touch movement state. The main processor may process data (or information) corresponding to a proximity touch operation or a proximity touch pattern sensed by the proximity sensor and control the display panel 10 to display visual information corresponding to the processed data.

The ultrasonic sensor may recognize location information of an object by using ultrasonic waves. The main processor 71 may calculate a location of an object through information sensed by the optical sensor and a plurality of ultrasonic sensors. As the speed of light and speed of ultrasonic wave are different from each other, the location of object may be calculated by using the time taken for the light to reach the optical sensor and the time taken for the ultrasonic wave to reach the ultrasonic sensor.

The output portion may generate an output regarding the sense of sight, hearing, or touch and include at least one of the display panel 10, the sound output portion, the haptic module, and the light output portion.

The sound output portion may output sound data received from the wireless communication portion or stored in the memory in a signal receiving mode, a call mode, a recording mode, a voice recognition mode, a broadcast receiving mode, etc. The sound output portion may output a sound signal related to a function performed in the display device 1 (e.g., a signal receive bell, a message receive bell, etc.). The sound output portion may include a receiver and a speaker. At least one of the receiver and the speaker may be a sound generation device attached to a lower portion of the display panel 10 and configured to output sound by vibrating the display panel 10. The sound generation device may be a piezoelectric element or a piezoelectric actuator which contracts or expands according to an electric signal or an exciter configured to vibrate the display panel 10 by generating a magnetic force using a voice coil.

The haptic module may give rise to various touch effects which may be sensed by a user. The haptic module may provide vibration to a user as a touch effect. The intensity, pattern, etc. of the vibration generated by the haptic module may be controlled according to the selection by a user or set-up by the main processor. For example, the haptic module may synthesize different vibrations and output the synthesized vibration or sequentially output different vibrations. In addition to the vibration, the haptic module may generate various touch effects including effects by stimuli, such as pin arrangement moving perpendicularly to the contact surface of skin, jet force or absorptive force of air through a jet orifice or an inlet, graze against the skin surface, contact with an electrode, and stimulus by electrostatic force, etc., effects by reproduction of sense of warmth and cold by using a device capable of heat absorption or generation, etc. The haptic module may not only transmit a touch effect through a direct touch but also be implemented to enable a user to sense the touch effect through the muscle sense of a finger, an arm, etc.

The light output portion may output a signal to notify occurrence of an event by using light of a light source. Examples of events generated in the display device 1 includes receipt of message, receipt of signal, missing calls, alarms, schedule reminders, receipt of emails, receipt of information through applications, etc. The signal output from the light output portion may be implemented according to emission of light of a single color or multiple colors by the display device 1 to the front surface or the rear surface. The output of the signal may be terminated when the display device 1 senses user's check of the event.

The interface portion may serve as a passage to various external device connected to the display device 1. The interface portion may include at least one of a wired/wireless headset port, an external charger port, a wired/wireless data port, a memory card, a port for connection with a device including an identification module, an audio input/output (I/O) port, a video I/O port, and an earphone port. In response to a connection between the interface portion and an external device, the display device 1 may perform proper control regarding the connected external device.

The memory may store data supporting various functions of the display device 1. The memory may store various application program executed in the display device 1, data for operations of the display device 1, and instructions. At least some of the applications may be downloaded from an external server through wireless communication. The memory may store an application for operation of the main processor and temporarily store input/output data, such as phone book data, message data, still image data, video data, etc. In addition, the memory may store haptic data for vibration of various patterns provided to the haptic module and sound data regarding various sounds provided to the sound output portion. The memory may include at least one type of record medium such as a flash memory type, a hard disk type, a solid state disk (SSD) type, a silicon disk drive (SDD) type, a multimedia card micro type, a card type (e.g., SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk.

The power supply portion may receive external power and internal power under the control by the main processor and supply the power to each component included in the display device 1. The power supply portion may include the battery. The power supply portion may include a connection port, and the connection port may be provided as an example of the interface portion electrically connected to an external charger supplying power to charge the battery. Alternatively, the power supply portion may charge the battery without using the connection port. The battery may receive power from an external wireless power transmission device by using at least one of inductive coupling method based on the induction phenomenon and magnetic resonance coupling method based on the electromagnetic resonance phenomenon. The battery may be arranged not to overlap the main circuit board in the third direction (z direction). The battery may overlap a battery hole of the bracket 60.

The gasket 80 may be arranged between the bracket 60 and the display circuit board 51. The gasket 80 may be arranged on the bracket 60 or the display circuit board 51. The gasket 80 may sense the distribution, intensity, etc. of the force applied to the bracket 60 when the bracket 60 is attached to the display panel 10. The bracket 60 may be arranged to correspond to the sensing area 55 in which the sensor arranged on the display circuit board 51 is arranged. In this case, the sensor may be arranged in the form of a wire on the display circuit board 51. In addition, the sensor may be connected to the touch driving portion 53 to sense a change in the touch driving portion 53 when the capacitance sensed by the sensor varies and identify the intensity of applied pressure.

The lower cover 90 may be arranged under the main circuit board 70 and the battery. The lower cover 90 may be coupled and fixed to the bracket 60. The lower cover 90 may form an outer appearance of a lower surface of the display device 1. The lower cover 90 may include a plastic, a metal or both a plastic and a metal.

Figure 4A:
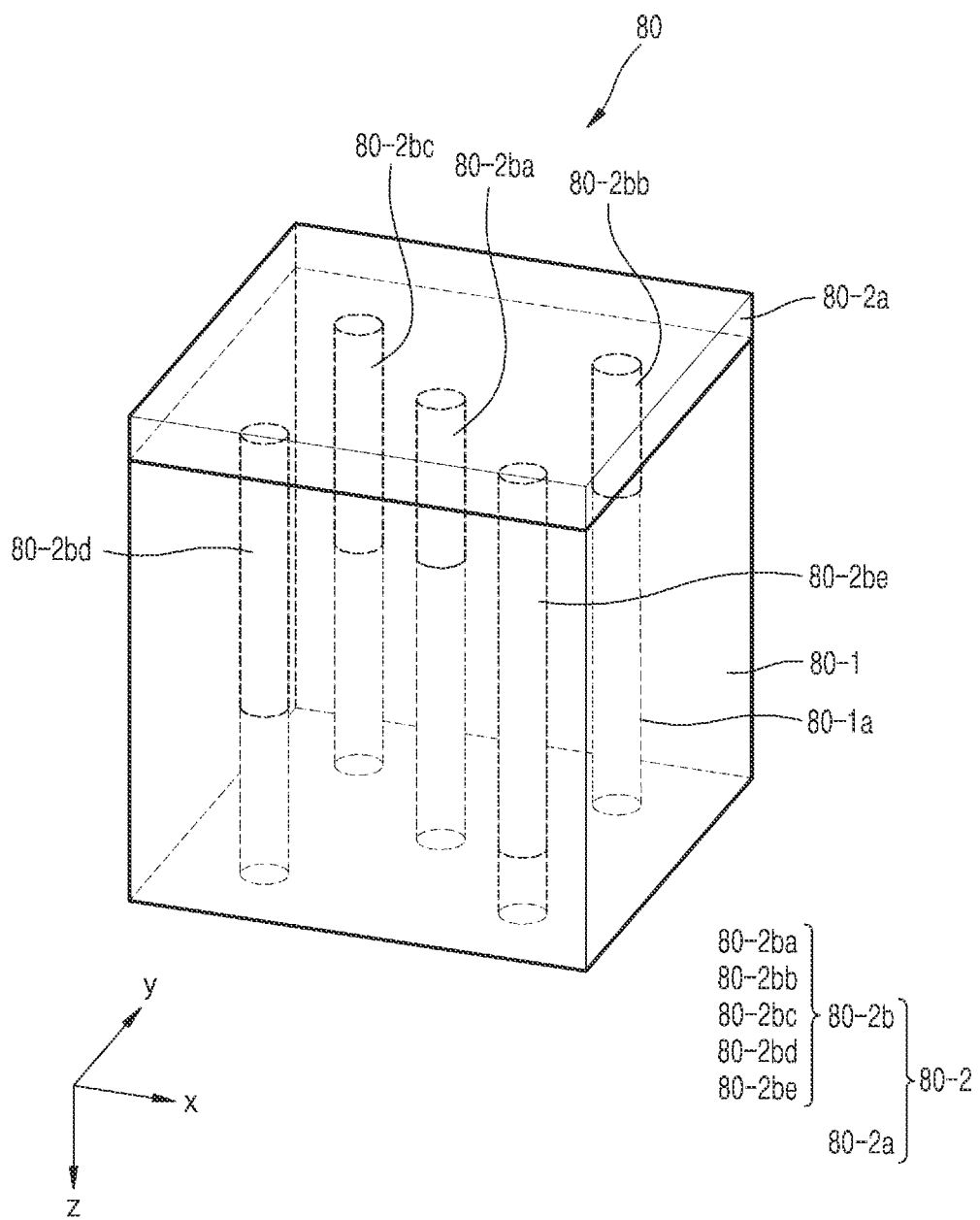
FIG. 4A is a perspective view schematically illustrating an embodiment of a gasket of FIG. 3.
Figure 4B:
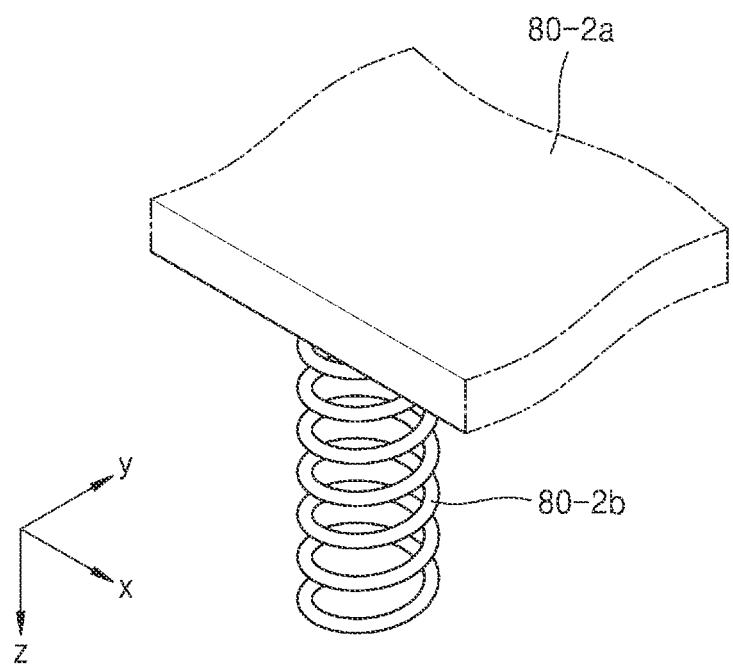
FIG. 4B is a perspective view schematically illustrating a part of the embodiment of a gasket of FIG. 3.

FIG. 4A is a perspective view schematically illustrating an embodiment of a gasket of FIG. 3. FIG. 4B is a perspective view schematically illustrating a part of the embodiment of a gasket of FIG. 3.

With reference to FIGS. 4A and 4B, the gasket 80 may include a gasket body portion 80-1 and a signal input portion 80-2.

The gasket body portion 80-1 may have a pillar shape. For example, the gasket body portion 80-1 may have a polyprismatic shape, a cylindrical shape, or an elliptic cylindrical shape. The gasket body portion 80-1 may include a synthetic resin such as rubber, silicon, urethane, etc. and/or an elastic material including a sponge. In such case, the gasket body portion 80-1 may be elastic to a certain level and absorb shock from the outside. Hereinafter, for convenient explanation, the embodiments are described focusing on the case where the gasket body portion 80-1 has a shape of a square pillar.

The signal input portion 80-2 may include a connection portion 80-2a and a terminal portion 80-2b. The signal input portion 80-2 may include an electroconductive material including copper, gold, silver, aluminum, etc.

The connection portion 80-2a may have a shape of a flat plate. The connection portion 80-2a may be arranged on one surface of the gasket body portion 80-1. The connection portion 80-2a may be attached to the gasket body portion 80-1 by a separate adhesive or be in direct contact with and fixed to the gasket body portion 80-1. The connection portion 80-2a may maintain a certain potential (or voltage). For example, the connection portion 80-2a may be connected to the ground and have a potential of 0 V. In another embodiment, the connection portion 80-2a may be connected to a battery, etc. of the display device 1 and have a potential other than 0 V.

The terminal portion 80-2b may be electrically connected to the connection portion 80-2a. The terminal portion 80-2b may protrude from one surface of the connection portion 80-2a. In this case, there may be a plurality of terminal portions 80-2b, and the plurality of terminal portions 80-2b may be arranged to be spaced apart from each other. Hereinafter, for convenient explanation, the embodiments are described focusing on the case where there are five terminal portions 80-2b.

The terminal portion 80-2b may be inserted into the gasket body portion 80-1. In an embodiment, one end of the terminal portion 80-2b may be exposed to the outside of the gasket body portion 80-1 according to a change of volume (or change of height) of the gasket body portion 80-1. For example, a hole 80-1a may be formed at the gasket body portion 80-1 into which the terminal portion 80-2b is inserted. In another embodiment, although it is not shown in the drawings, the terminal portion 80-2b may also be completely inserted into the gasket body portion 80-1. Hereinafter, for convenient explanation, the embodiments are described focusing on the case where the terminal portion 80-2b is arranged inside the gasket body portion 80-1, and the hole 80-1a is formed in the gasket body portion 80-1.

The terminal portion 80-2b may have various shapes. For example, the terminal portion 80-2b may have a pillar shape as illustrated in FIG. 4A. In another embodiment, the terminal portion 80-2b may have a coil spring shape as illustrated in FIG. 4B. In another embodiment, although it is not shown in the drawings, the terminal portion 80-2b may be a flexible hose type. In this case, the terminal portion 80-2b may have elasticity to a certain degree and thus may be elastic.

The plurality of terminal portions 80-2b may include a first terminal portion 80-2ba, a second terminal portion 80-2bb, a third terminal portion 80-2bc, a fourth terminal portion 80-2bd, and a fifth terminal portion 80-2be, which are arranged to be spaced apart from each other.

The first terminal portion 80-2ba, the second terminal portion 80-2bb, the third terminal portion 80-2bc, the fourth terminal portion 80-2bd, and the fifth terminal portion 80-2be may be arranged in various ways. For example, the first terminal portion 80-2ba, the second terminal portion 80-2bb, the third terminal portion 80-2bc, the fourth terminal portion 80-2bd, and the fifth terminal portion 80-2be may be arranged in a row. In another embodiment, one of the first terminal portion 80-2ba, the second terminal portion 80-2bb, the third terminal portion 80-2bc, the fourth terminal portion 80-2bd, and the fifth terminal portion 80-2be may be arranged at the center of the gasket body portion 80-1, and the others may be spaced apart from the one of the first terminal portion 80-2ba, the second terminal portion 80-2bb, the third terminal portion 80-2bc, the fourth terminal portion 80-2bd, and the fifth terminal portion 80-2be arranged at the center of the gasket body portion 80-1 at a certain distance. In this case, the others of the first terminal portion 80-2ba, the second terminal portion 80-2bb, the third terminal portion 80-2bc, the fourth terminal portion 80-2bd, and the fifth terminal portion 80-2be which is not arranged at the center of the gasket body portion 80-1 may be arranged on a circumference of a circle having a center of the gasket body portion 80-1 as a center of the circle. In another embodiment, distances between the first terminal portion 80-2ba, the second terminal portion 80-2bb, the third terminal portion 80-2bc, the fourth terminal portion 80-2bd, and the fifth terminal portion 80-2be may be different from each other. In another embodiment, one of the first terminal portion 80-2ba, the second terminal portion 80-2bb, the third terminal portion 80-2bc, the fourth terminal portion 80-2bd, and the fifth terminal portion 80-2be may be arranged at the center of the gasket body portion 80-1, and the others may be spaced apart from one of the first terminal portion 80-2ba, the second terminal portion 80-2bb, the third terminal portion 80-2bc, the fourth terminal portion 80-2bd, and the fifth terminal portion 80-2be arranged at the center of the gasket body portion 80-1 at different distances from each other. The arrangement of the first terminal portion 80-2ba, the second terminal portion 80-2bb, the third terminal portion 80-2bc, the fourth terminal portion 80-2bd, and the fifth terminal portion 80-2be is not limited thereto, and may vary. However, hereinafter, the embodiments are described in detail focusing on the case where one of the first terminal portion 80-2ba, the second terminal portion 80-2bb, the third terminal portion 80-2bc, the fourth terminal portion 80-2bd, and the fifth terminal portion 80-2be is arranged at the center of the gasket body portion 80-1, and the others are arranged on the same circumference around one of the first terminal portion 80-2*ba*, the second terminal portion 80-2*bb*, the third terminal portion 80-2*bc*, the fourth terminal portion 80-2*bd*, and the fifth terminal portion 80-2*be* arranged at the center of the gasket body portion 80-1.

The first terminal portion 80-2*ba* may be arranged at the center of the gasket body portion 80-1. The second terminal portion 80-2*bb*, the third terminal portion 80-2*bc*, the fourth terminal portion 80-2*bd*, and the fifth terminal portion 80-2*be* may be arranged radially with respect to the first terminal portion 80-2*ba*. The second terminal portion 80-2*bb*, the third terminal portion 80-2*bc*, the fourth terminal portion 80-2*bd*, and the fifth terminal portion 80-2*be* may be arranged to be spaced apart from the first terminal portion 80-2*ba* at the same distance.

A length of one of the first terminal portion 80-2*ba*, the second terminal portion 80-2*bb*, the third terminal portion 80-2*bc*, the fourth terminal portion 80-2*bd*, and the fifth terminal portion 80-2*be* may be different from a length of another one of the first terminal portion 80-2*ba*, the second terminal portion 80-2*bb*, the third terminal portion 80-2*bc*, the fourth terminal portion 80-2*bd*, and the fifth terminal portion 80-2*be*. For example, a length of one of the first terminal portion 80-2*ba*, the second terminal portion 80-2*bb*, the third terminal portion 80-2*bc*, the fourth terminal portion 80-2*bd*, and the fifth terminal portion 80-2*be* may be greater or less than a length of another one of the first terminal portion 80-2*ba*, the second terminal portion 80-2*bb*, the third terminal portion 80-2*bc*, the fourth terminal portion 80-2*bd*, and the fifth terminal portion 80-2*be*. In another embodiment, the first terminal portion 80-2*ba*, the second terminal portion 80-2*bb*, the third terminal portion 80-2*bc*, the fourth terminal portion 80-2*bd*, and the fifth terminal portion 80-2*be* may have different lengths from each other. Hereinafter, the embodiments are described in detail focusing on the case where the first terminal portion 80-2*ba*, the second terminal portion 80-2*bb*, the third terminal portion 80-2*bc*, the fourth terminal portion 80-2*bd*, and the fifth terminal portion 80-2*be* have different lengths from each other for convenient explanation.

In an embodiment, as disclosed in FIG. 4A, the length of the second terminal portion 80-2*bb* may be less than the length of each of the first terminal portion 80-2*ba*, the third terminal portion 80-2*bc*, the fourth terminal portion 80-2*bd*, and the fifth terminal portion 80-2*be*. In addition, the length of the second terminal portion 80-2*bb*, the length of the third terminal portion 80-2*bc*, the length of the fourth terminal portion 80-2*bd*, and the length of the fifth terminal portion 80-2*be* may be increased sequentially. The length of the first terminal portion 80-2*ba* may be greater than the length of the second terminal portion 80-2*bb* and less than the length of the third terminal portion 80-2*bc*. The length of the first terminal portion 80-2*ba*, the second terminal portion 80-2*bb*, the third terminal portion 80-2*bc*, the fourth terminal portion 80-2*bd*, and the fifth terminal portion 80-2*be* is not limited thereto, and may vary.

The first terminal portion 80-2*ba*, the second terminal portion 80-2*bb*, the third terminal portion 80-2*bc*, the fourth terminal portion 80-2*bd*, and the fifth terminal portion 80-2*be* each having the aforementioned length may be inserted into the gasket body portion 80-1. A length of each of the first terminal portion 80-2*ba*, the second terminal portion 80-2*bb*, the third terminal portion 80-2*bc*, the fourth terminal portion 80-2*bd*, and the fifth terminal portion 80-2*be* may be less than a height of the gasket body portion 80-1. In such case, an end of each of the first terminal portion 80-2*ba*, the second terminal portion 80-2*bb*, the third terminal portion 80-2*bc*, the fourth terminal portion 80-2*bd*, and the fifth terminal portion 80-2*be* (for example, an end in the z direction) may be spaced apart from the bottom surface of the gasket body portion 80-1.

Such terminal portion 80-2*b* may generate a signal corresponding to a distance between the bottom surface of the gasket body portion 80-1 and an end of the terminal portion 80-2*b* disposed close to the bottom surface of the gasket body portion 80-1, or distance from the terminal portion 80-2*b* to the sensor 56 (see FIG. 6A) in the display circuit board arranged under the gasket body portion 80-1 or a contact between the terminal portion 80-2*b* and the sensor 56.

Figure 5:
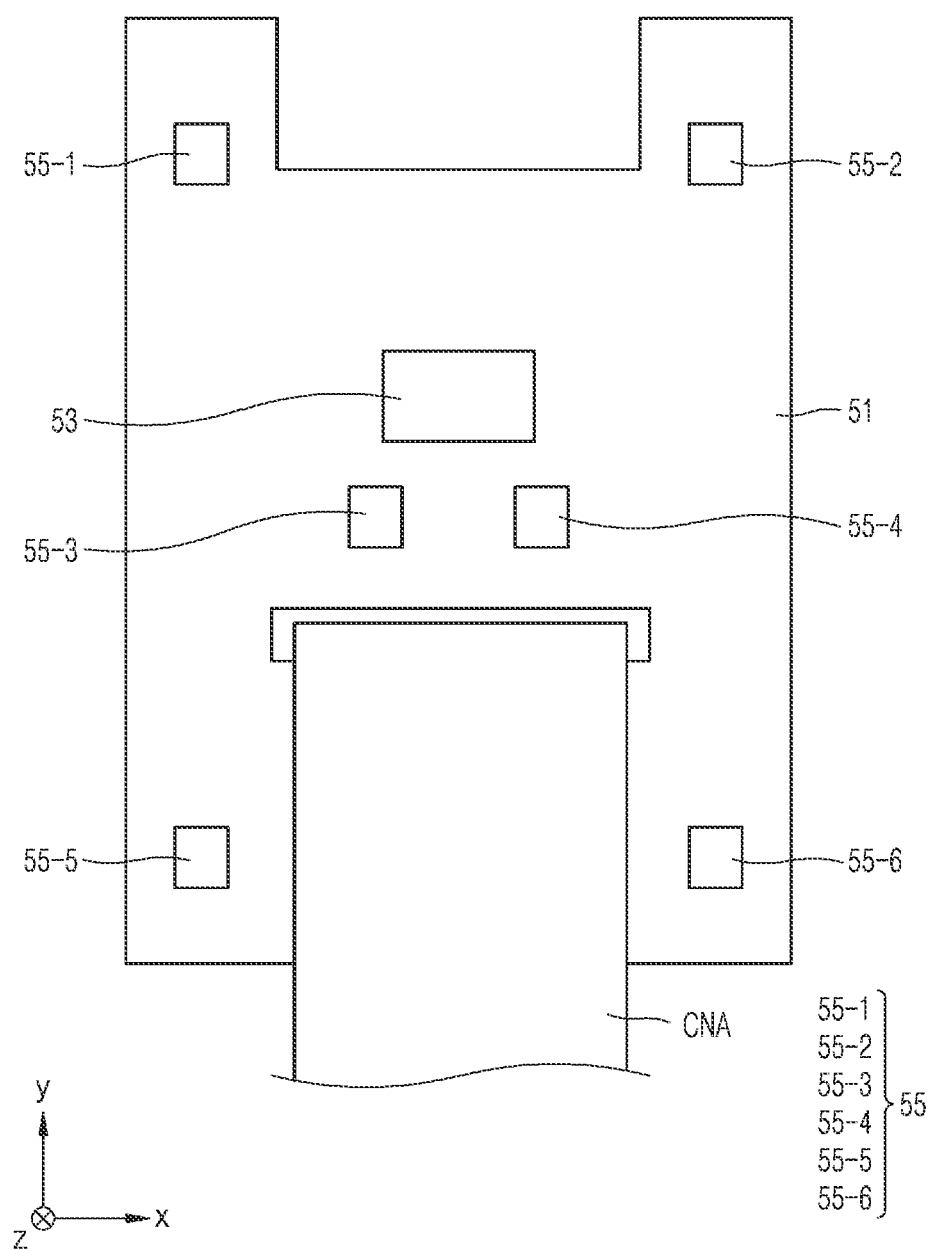
FIG. 5 is a rear view schematically illustrating a position of a display circuit board (for example, flexible circuit board) and a gasket of FIG. 3.

FIG. 5 is a rear view schematically illustrating a position of a display circuit board and a gasket of FIG. 3.

With reference to FIG. 5, further referring to FIG. 3, the display circuit board 51 may be bent. The display circuit board 51 may include a first surface and a second surface. In FIG. 3, the first surface may be a surface facing the display panel 10, and the second surface may be a surface facing the bracket 60.

In this case, the display circuit board 51 may be connected to a main circuit board (not shown) through a connector CNA. The connector CNA may include a flexible printed circuit board. One end of the connector CNA may be attached to the display circuit board 51, and the other end of the connector CNA may be connected to the main circuit board 70 (see FIG. 2).

The display circuit board 51 may be arranged on the rear side of the display panel 10. The display circuit board 51 may include a sensing area 55. There may be a plurality of sensing areas 55. For example, each of the sensing areas 55 may correspond to corresponding gasket 80.

Each sensing area 55 may sense deformation of corresponding gasket 80 arranged to correspond to each sensing area 55. Each sensing area 55 may sense a signal generated according to deformation of corresponding gasket 80.

As described above, the position and number of the sensing areas 55 may be determined according to the position and number of the gaskets 80. Hereinafter, the embodiments are described in detail focusing on the case where six gaskets 80 are arranged for convenient explanation.

The plurality of sensing areas 55 may include a first sensing area 55-1, a second sensing area 55-2, a third sensing area 55-3, a fourth sensing area 55-4, a fifth sensing area 55-5, and a sixth sensing area 55-6. Each of the first sensing area 55-1, the second sensing area 55-2, the fifth sensing area 55-5, and the sixth sensing area 55-6 may be arranged at an edge portion of the display circuit board 51. The third sensing area 55-3 and the fourth sensing area 55-4 may be arranged at the central portion of the display circuit board 51 and may each be arranged on one side of a connecting portion of the connector CNA connected to the display circuit board 51 and disposed close to the connecting portion of the connector CNA. The first sensing area 55-1 and the second sensing area 55-2 may each be arranged on the one side of the connecting portion of the connector CNA connected to the display circuit board 51, and the fifth sensing area 55-5 and the sixth sensing area 55-6 may each be arranged on the other side of the connecting portion of the connector CNA connected to the display circuit board 51.

Figure 6A:
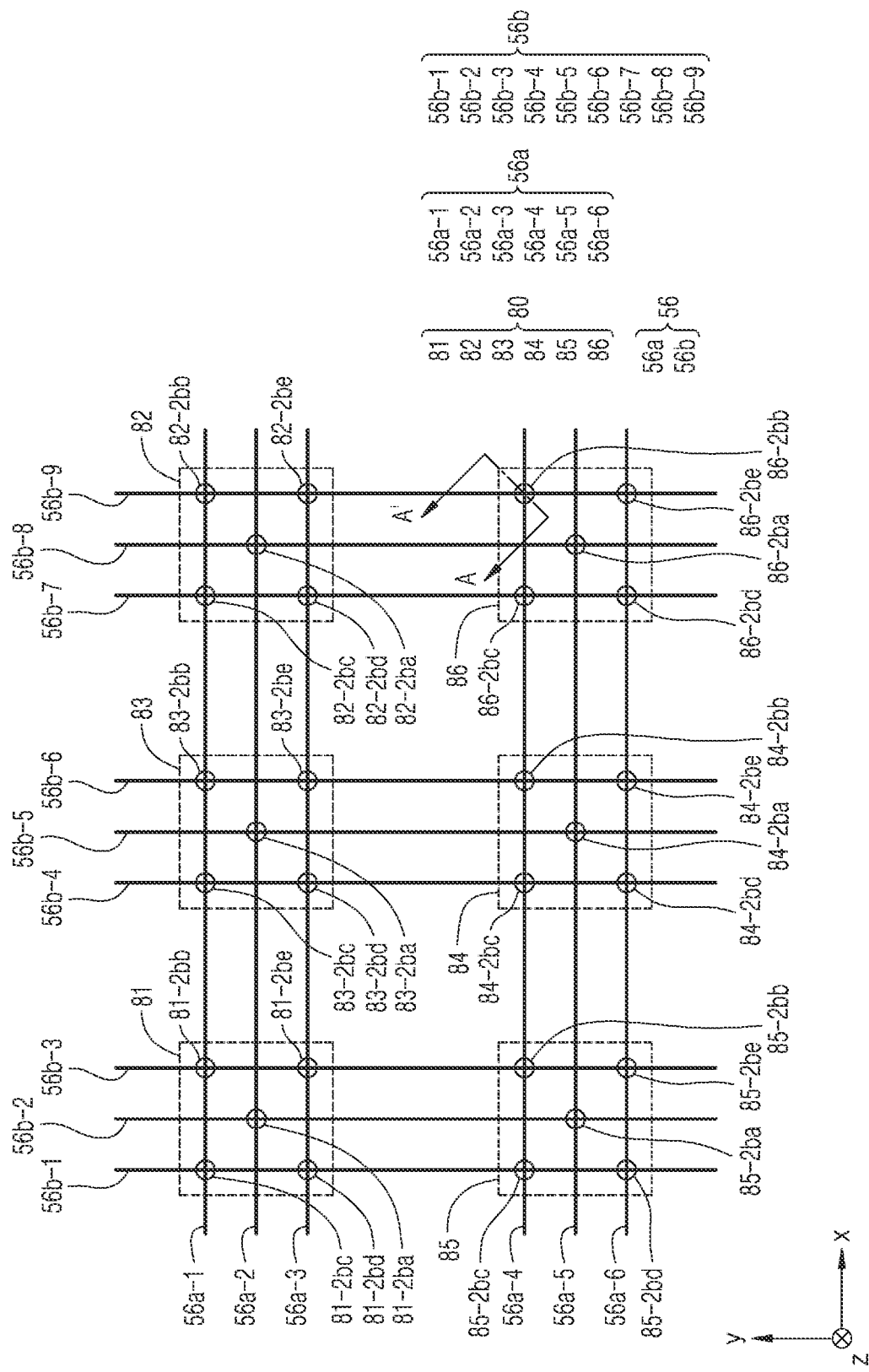
FIG. 6A is a circuit diagram schematically illustrating a gasket and a sensor of FIG. 3.
Figure 6B:
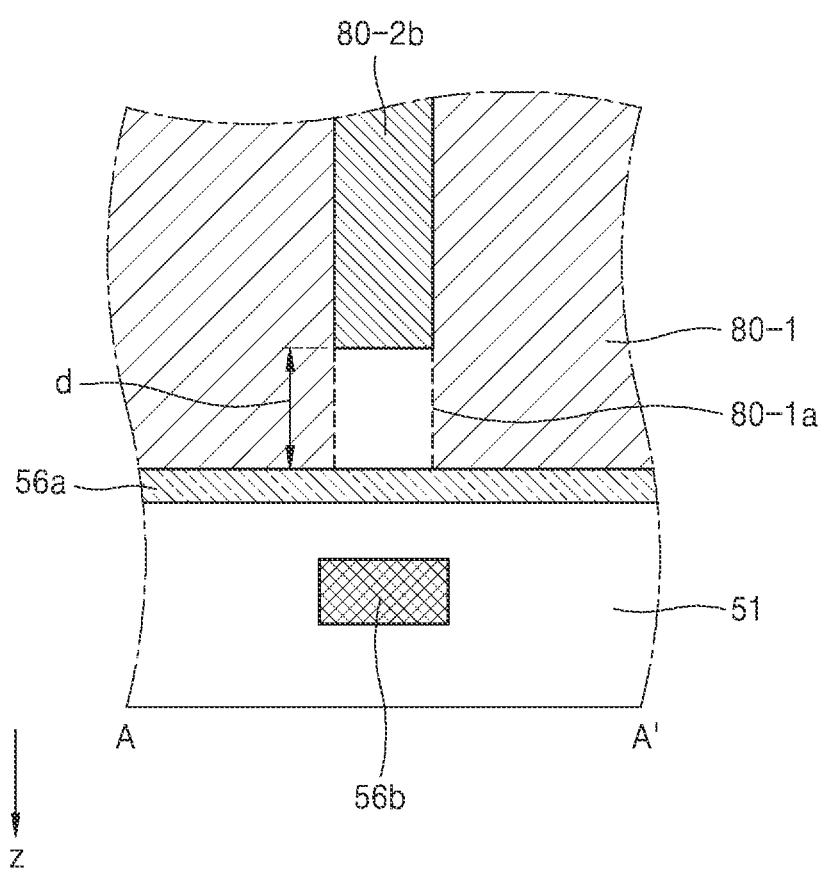
FIG. 6B is a cross-sectional view taken along line A-A' of FIG. 6A.

FIG. 6A is a circuit diagram schematically illustrating a gasket and a sensor of FIG. 3. FIG. 6B is a cross-sectional view taken along line A-A' of FIG. 6A. FIG. 6A is a circuit diagram schematically illustrating a position of a sensor and a gasket illustrated in FIG. 5. FIG. 6B is a cross-sectional view illustrating a 1-1 wire, a 2-1 wire, and a first gasket illustrated in FIG. 6A.

With reference to FIG. 6A, further referring to FIG. 5, the gasket 80 may be arranged on a sensor 56. For example, a plurality of gaskets 80 may be arranged on the sensor 56. The plurality of gaskets 80 may be arranged to be spaced apart from each other. For example, the plurality of gaskets 80 may include a first gasket 81, a second gasket 82, a third gasket 83, a fourth gasket 84, a fifth gasket 85, and a sixth gasket 86, which are arranged to be spaced apart from each other. The number of gasket 80 is not limited thereto, and there may be at least two gaskets 80. In this case, each gasket 80 may be arranged in each sensing area illustrated in FIG. 5.

The sensor 56 may include a first wire 56a and a second wire 56b which intersect each other on a surface of the display circuit board 51 in plan view. The first wire 56a and the second wire 56b may be electrically insulated from each other. Each of the first wire 56a and the second wire 56b may be arranged to overlap each sensing area (not denoted) illustrated in FIG. 5 at least once. Each of the first wire 56a and the second wire 56b may include a plurality of wires, thereby forming a plurality of intersections. The plurality of first wires 56a may be arranged to be parallel with each other and spaced apart from each other. The plurality of second wires 56b may be arranged to be parallel with each other and spaced apart from each other. In this case, each of the first wires 56a and each of the second wires 56b may intersect each other at one point in plan view. In an embodiment, the first wire 56a and the second wire 56b may be arranged on different layers from each other. For example, one of the first wire 56a and the second wire 56b may be arranged on one of outer surfaces of the display circuit board 51 and the other one of the first wire 56a and the second wire 56b may be arranged inside the display circuit board 51 or on another outer surface of the display circuit board 51. In plan view, a part of the display circuit board 51 may be arranged between the first wire 56a and the second wire 56b at an intersection between the first wire 56a and the second wire 56b to electrically insulate the first wire 56a and the second wire 56b from each other. In another embodiment, the first wire 56a and the second wire 56b may be arranged on the same layer and at different heights from each other. For example, the first wire 56a and the second wire 56b may be arranged to be spaced apart from each other in the height direction of the display circuit board 51 inside the display circuit board 51. In this case, a part of the display circuit board 51 may be arranged between the first wire 56a and the second wire 56b to electrically insulate the first wire 56a and the second wire 56b from each other. In another embodiment, the first wire 56a and the second wire 56b may be arranged on the same layer and at the same height. For example, the first wire 56a and the second wire 56b may be arranged on the same outer surface of the display circuit board 51 or at the same height inside the display circuit board 51. In plan view, a separate insulating material may be arranged between the first wire 56a and the second wire 56b which intersect each other to insulate the first wire 56a and the second wire 56b from each other. Moreover, in this case, one of the first wire 56a and the second wire 56b may be arranged to extend over or under the other one of the first wire 56a and the second wire 56b at an intersection between the first wire 56a and the second wire 56b in plan view. That is, in plan view, one of the first wire 56a and the second wire 56b may include a bridge which extends from one of the first wire 56a and the second wire 56b at an intersection between the first wire 56a and the second wire 56b and is connected to the one of the first wire 56a and the second wire 56b at a different height. The one of the first wire and the second wire bypasses the other one of the first wire and the second wire through a bridge in the intersection area so as not to be connected to the other one of the first wire and the second wire.

One of the first wire 56a and the second wire 56b may be arranged at a height different than that of the other one of the first wire 56a and the second wire 56b. Hereinafter, the embodiments are described in detail focusing on the case where the first wire 56a is arranged on an outer surface of the display circuit board 51, the second wire 56b is arranged inside the display circuit board 51, and a part of the display circuit board 51 is arranged between the first wire 56a and the second wire 56b for convenient explanation.

In an embodiment, a width of at least one of the first wire 56a and the second wire 56b in the longitudinal direction may have an uniform width. In another embodiment, although it is not shown in the drawings, at least one of the first wire 56a and the second wire 56b may have a width that varies at the intersection between the first wire 56a and the second wire 56b in plan view. For example, at least one of the first wire 56a and the second wire 56b may be formed in the diamond shape at the intersection between the first wire 56a and the second wire 56b and thus include an electrode having a greater area than other parts.

The sensor 56 may sense a signal according to deformation of the gasket 80 arranged in the sensing area. For example, in an embodiment, the sensor 56 may sense deformation of the gasket 80 based on a change in distance between the sensor 56 and at least one of contact portions of the gasket 80. More specifically, when the distance between at least one of the contact portions of the gasket 80 and one of the first wire 56a and the second wire 56b changes, the capacitance between the first wire 56a and the second wire 56b may be changed, and the touch driving portion 53 may calculate such change to identify deformation of the gasket 80.

In another embodiment, the sensor 56 may sense deformation of the gasket 80 in case of contact of at least one of the contact portions of the gasket 80 to the display circuit board 51. In this case, as described above, the touch driving portion 53 may sense a change in capacitance between the first wire 56a and the second wire 56b at the intersection between the first wire 56a and the second wire 56b to identify deformation of the gasket 80.

In another embodiment, the sensor 56 may sense a signal according to a change in distance or a contact between the sensor 56 and at least one of the contact portions of the gasket 80.

Hereinafter, the embodiments are described in detail focusing on the case where the sensor 56 senses deformation of the gasket 80 when the distance between the sensor 56 and at least one of the contact portions of the gasket 80 changes and/or when at least one of the contact portions of the gasket 80 is in contact with the sensor 56 for convenient explanation.

The number of the first wire 56a may be determined according to the number of the gasket 80. More specifically, the number of the first wire 56a may be identical to the number of terminal portion (not shown) not arranged on the same plane as the first wire 56a. The first wire 56a may have a straight line shape. In another embodiment, the first wire 56a may not have the straight line shape. A part of the first wire 56a may be in the shape of a straight line and another part of the first wire 56a may be bent or rounded (for example, circular).

The first gasket 81 may include a 1-1 terminal portion 81-2ba, a 2-1 terminal portion 81-2bb, a 3-1 terminal portion 81-2bc, a 4-1 terminal portion 81-2bd, and a 5-1 terminal portion 81-2be. The second gasket 82 may include a 1-2 terminal portion 82-2ba, a 2-2 terminal portion 82-2bb, a 3-2 terminal portion 82-2bc, a 4-2 terminal portion 82-2bd, and a 5-2 terminal portion 82-2be. The third gasket 83 may include a 1-3 terminal portion 83-2ba, a 2-3 terminal portion 83-2bb, a 3-3 terminal portion 83-2bc, a 4-3 terminal portion 83-2bd, and a 5-3 terminal portion 83-2be. The fourth gasket 84 may include a 1-4 terminal portion 84-2ba, a 2-4 terminal portion 84-2bb, a 3-4 terminal portion 84-2bc, a 4-4 terminal portion 84-2bd, and a 5-4 terminal portion 84-2be. The fifth gasket 85 may include a 1-5 terminal portion 85-2ba, a 2-5 terminal portion 85-2bb, a 3-5 terminal portion 85-2bc, a 4-5 terminal portion 85-2bd, and a 5-5 terminal portion 85-2be. The sixth gasket 86 may include a 1-6 terminal portion 86-2ba, a 2-6 terminal portion 86-2bb, a 3-6 terminal portion 86-2bc, a 4-6 terminal portion 86-2bd, and a 5-6 terminal portion 86-2be.

The first wire 56a may include a 1-1 wire 56a-1, a 1-2 wire 56a-2, a 1-3 wire 56a-3, a 1-4 wire 56a-4, a 1-5 wire 56a-5, and a 1-6 wire 56a-6 which are sequentially arranged to be spaced apart from each other from the top.

The 1-1 wire 56a-1, the 1-2 wire 56a-2, and the 1-3 wire 56a-3 may be each covered by the first gasket 81, the second gasket 82, and the third gasket 83. In this case, the 1-1 wire 56a-1 may be arranged to overlap the 2-1 terminal portion 81-2bb, the 3-1 terminal portion 81-2bc, the 2-2 terminal portion 82-2bb, the 3-2 terminal portion 82-2bc, the 2-3 terminal portion 83-2bb, and the 3-3 terminal portion 83-2bc. At least one of the 2-1 terminal portion 81-2bb, the 3-1 terminal portion 81-2bc, the 2-2 terminal portion 82-2bb, the 3-2 terminal portion 82-2bc, the 2-3 terminal portion 83-2bb, and the 3-3 terminal portion 83-2bc may contact the 1-1 wire 56a-1 according to the position, intensity, etc. of the force applied to the bracket 60. The 1-2 wire 56a-2 may be arranged to overlap the 1-1 terminal portion 81-2ba, the 1-2 terminal portion 82-2ba, and the 1-3 terminal portion 83-2ba. At least one of the 1-1 terminal portion 81-2ba, the 1-2 terminal portion 82-2ba, and the 1-3 terminal portion 83-2ba may be contact the 1-2 wire 56a-2 according to the position, intensity, etc. of the force applied to the bracket 60. In addition, similar to the 1-1 wire 56a-1, the 1-3 wire 56a-3 may be arranged to overlap the 4-1 terminal portion 81-2bd, the 5-1 terminal portion 81-2be, the 4-2 terminal portion 82-2bd, the 5-2 terminal portion 82-2be, the 4-3 terminal portion 83-2bd, and the 5-3 terminal portion 83-2be. At least one of the 4-1 terminal portion 81-2bd, the 5-1 terminal portion 81-2be, the 4-2 terminal portion 82-2bd, the 5-2 terminal portion 82-2be, the 4-3 terminal portion 83-2bd, and the 5-3 terminal portion 83-2be may contact the 1-3 wire 56a-3 according to the position, intensity, etc. of the force applied to the bracket 60.

The 1-4 wire 56a-4, the 1-5 wire 56a-5, and the 1-6 wire 56a-6 may be each arranged under the fourth gasket 84, the fifth gasket 85, and the sixth gasket 86. In this case, the 1-4 wire 56a-4 may be arranged to overlap the 2-4 terminal portion 84-2bb, the 3-4 terminal portion 84-2bc, the 2-5 terminal portion 85-2bb, the 3-5 terminal portion 85-2bc, the 2-6 terminal portion 86-2bb, and the 3-6 terminal portion 86-2bc. The 1-5 wire 56a-5 may be arranged to overlap the 1-4 terminal portion 84-2ba, the 1-5 terminal portion 85-2ba, and the 1-6 terminal portion 86-2ba. In addition, the 1-6 wire 56a-6 may be arranged to overlap the 4-4 terminal portion 84-2bd, the 5-4 terminal portion 84-2be, the 4-5 terminal portion 85-2bd, the 5-5 terminal portion 85-2be, the 4-6 terminal portion 86-2bd, and the 5-6 terminal portion 86-2be.

In this case, the second wire 56b may include a 2-1 wire 56b-1, a 2-2 wire 56b-2, a 2-3 wire 56b-3, a 2-4 wire 56b-4, a 2-5 wire 56b-5, a 2-6 wire 56b-6, a 2-7 wire 56b-7, a 2-8 wire 56b-8, and a 2-9 wire 56b-9 from the left in FIG. 6A. In this case, the 2-1 wire 56b-1 may overlap the 3-1 terminal portion 81-2bc, the 4-1 terminal portion 81-2bd, the 3-5 terminal portion 85-2bc, and the 4-5 terminal portion 85-2bd in plan view. In plan view, the 2-2 wire 56b-2 may overlap the 1-1 terminal portion 81-2ba and the 1-5 terminal portion 85-2ba. Also, in plan view, the 2-3 wire 56b-3 may overlap the 2-1 terminal portion 81-2bb, the 5-1 terminal portion 81-2be, the 2-5 terminal portion 85-2bb, and the 5-5 terminal portion 85-2be. In plan view, the 2-4 wire 56b-4 may overlap the 3-3 terminal portion 83-2bc, the 4-3 terminal portion 83-2bd, the 3-4 terminal portion 84-2bc, and the 4-4 terminal portion 84-2bd. In plan view, the 2-5 wire 56b-5 may overlap the 1-3 terminal portion 83-2ba and the 1-4 terminal portion 84-2ba. In addition, in plan view, the 2-6 wire 56b-6 may overlap the 2-3 terminal portion 83-2bb, the 5-3 terminal portion 83-2be, the 2-4 terminal portion 84-2bb, and the 5-4 terminal portion 84-2be. In plan view, the 2-7 wire 56b-7 may overlap the 3-2 terminal portion 82-2bc, the 4-2 terminal portion 82-2bd, the 3-6 terminal portion 86-2bc, and the 4-6 terminal portion 86-2bd. In plan view, the 2-8 wire 56b-8 may overlap the 1-2 terminal portion 82-2ba and the 1-6 terminal portion 86-2ba. In plan view, the 2-9 wire 56b-9 may overlap the 2-2 terminal portion 82-2bb, the 5-2 terminal portion 82-2be, the 2-6 terminal portion 86-2bb, and 5-6 terminal portion 86-2be.

In this case, the first wire 56a and the second wire 56b may intersect each other at a plurality of points in a plan view. The intersections between the first wire 56a and the second wire 56b may be arranged under each terminal portion of each gasket 80. That is, in FIG. 6A, the intersections between the first wire 56a and the second wire 56b may be respectively arranged under the 1-1 terminal portion 81-2ba to the 5-1 terminal portion 81-2be. In addition, the intersections between the first wire 56a and the second wire 56b may respectively arranged under the 1-2 terminal portion 82-2ba to the 5-2 terminal portion 82-2be, under the 1-3 terminal portion 83-2ba to the 5-3 terminal portion 83-2be, under the 1-4 terminal portion 84-2ba to the 5-4 terminal portion 84-2be, under the 1-5 terminal portion 85-2ba to the 5-5 terminal portion 85-2be, and under the 1-6 terminal portion 86-2ba to the 5-6 terminal portion 86-2be.

In this case, the first wire 56a and the second wire 56b may also be connected to the touch driving portion 53 (see FIG. 5). When each terminal portion is close to or in contact with the second wire 56b at an intersection between the first wire 56a and the second wire 56b, the touch driving portion 53 may sense a change in capacitance between the first wire 56a and the second wire 56b, which arranged to intersect each other under each terminal portion. In this manner, the touch driving portion 53 may sense a terminal portion which has a contact with or a changed distance to an intersection between the first wire 56a and the second wire 56b, among a plurality of terminal portions based on the change in capacitance.

With reference to FIGS. 3 and 6B, the bracket 60 may be coupled to the cover 50 while pressure is applied to the bracket 60 from under the display panel 10. The force may be applied to an entire outer surface of the bracket 60 (e.g., a surface on which the main circuit board is to be arranged) or to a plurality of portions of the outer surface of the bracket 60.

In this case, when the force is not uniformly applied to the outer surface of the bracket 60 or the force applied to each gasket 80 by the bracket 60 is not evenly applied among the gaskets 80 due to the force applied to the outer surface of the bracket 60, at least a part of the display panel 10 or at least a part of the cover 50 may be damaged. More specifically, an edge of the display panel 10 or an edge of the cover 50 may be damaged.

When a force is applied to the bracket 60, the touch driving portion 53 may sense a signal generated by deformation of at least one of the plurality of gaskets 80 to detect and identify distribution, intensity, etc. of the force applied to the bracket 60. For example, when a signal is generated at one gasket 80 of the plurality of gaskets 80 (e.g., one of the first gasket 81 to the sixth gasket 86), it may be understood that the force applied to the one gasket 80 at which the signal is generated is greater than the force applied to other gaskets 80 (e.g., another one of the first gasket 81 to the sixth gasket 86) or the force applied to the gasket 80 at which the signal is generated and other gaskets 80 is out of balance. In this case, the distribution of force applied to the bracket 60 may be adjusted or a part of the bracket 60 to which the force is applied may be changed. In another embodiment, the foregoing process may be performed by calculating the number of terminal portions of each gasket 80 which are in contact with the first wire 56*a* or have a distance to the first wire 56*a* that is different from an initial distance among the plurality of gaskets 80. More specifically, when the number of terminal portions of one of the plurality of gaskets 80 that are in contact with the first wire 56*a* or have a changed distance d to the first wire 56*a* is different from the number of terminal portions of another one of the plurality of gaskets 80 that are in contact with the first wire 56*a* or have a changed distance d to the first wire 56*a*, the position, intensity, etc. of the force applied to the bracket 60 may be adjusted such that the numbers become identical to each other. For example, when the number of terminal portions of the first gasket 81 that are in contact with the first wire 56*a* or have a changed distance d to the first wire 56*a* is greater than the number of terminal portions of the second gasket 82 that are in contact with the first wire 56*a* or have a changed distance d to the first wire 56*a*, it may be determined that the first gasket 81 part receives greater force than the second gasket 82 part, and then the intensity of the force applied to the part of the bracket 60 at which the first gasket 81 is arranged may be reduced or the intensity of the force applied to the part of the bracket 60 at which the second gasket 82 is arranged may be increased. Alternatively, the force applied to other parts of the bracket 60 may also be adjusted. On the contrary, when the number of terminal portions of the first gasket 81 that are in contact with the first wire 56*a* or have a changed distance d to the first wire 56*a* is less than the number of terminal portions of the second gasket 82 that are in contact with the first wire 56*a* or have a changed distance d to the first wire 56*a*, it may be determined that the first gasket 81 part receives less force than the second gasket 82 part, and then the intensity of the force applied to the part of the bracket 60 at which the first gasket 81 is arranged may be increased or the intensity of the force applied to the part of the bracket 60 at which the second gasket 82 is arranged may be reduced. Such method is not limited to the foregoing, and may include all methods of determining the intensity, position, distribution, etc. of the force applied to the bracket 60 based on the number, position, etc. of terminal portions of each gasket that are in contact with each wire.

In this case, the force applied to the bracket 60 may be adjusted such that the number of terminal portions of each gasket 80 which are in contact with the first wire 56*a* or have a changed distance d to the first wire 56*a* remains the same as a preset number. For example, the intensity of force applied to the bracket 60 may be controlled such that the preset number of terminal portions of each gasket 80 are in contact with the first wire 56*a* when the force is applied to the bracket 60. In this case, as described above, the intensity, position, etc. of the force may also be adjusted.

Accordingly, in the display device 1, no damage to the display device 1 occurs during the attachment of the bracket 60, which leads to longer lifespan. The display device 1 may implement a clear image.

In the display device 1, as the bracket 60 is supported by the terminal portion 80-2*b* arranged at the gasket 80, even when an external force is applied to the bracket 60, movement of the bracket 60 toward the display panel 10 may be prevented.

The foregoing process is not applied limited to the case where the bracket 60 is coupled to the display panel 10, and it may also be applicable when the lower cover 90 is arranged at the bracket 60.

Figure 7:
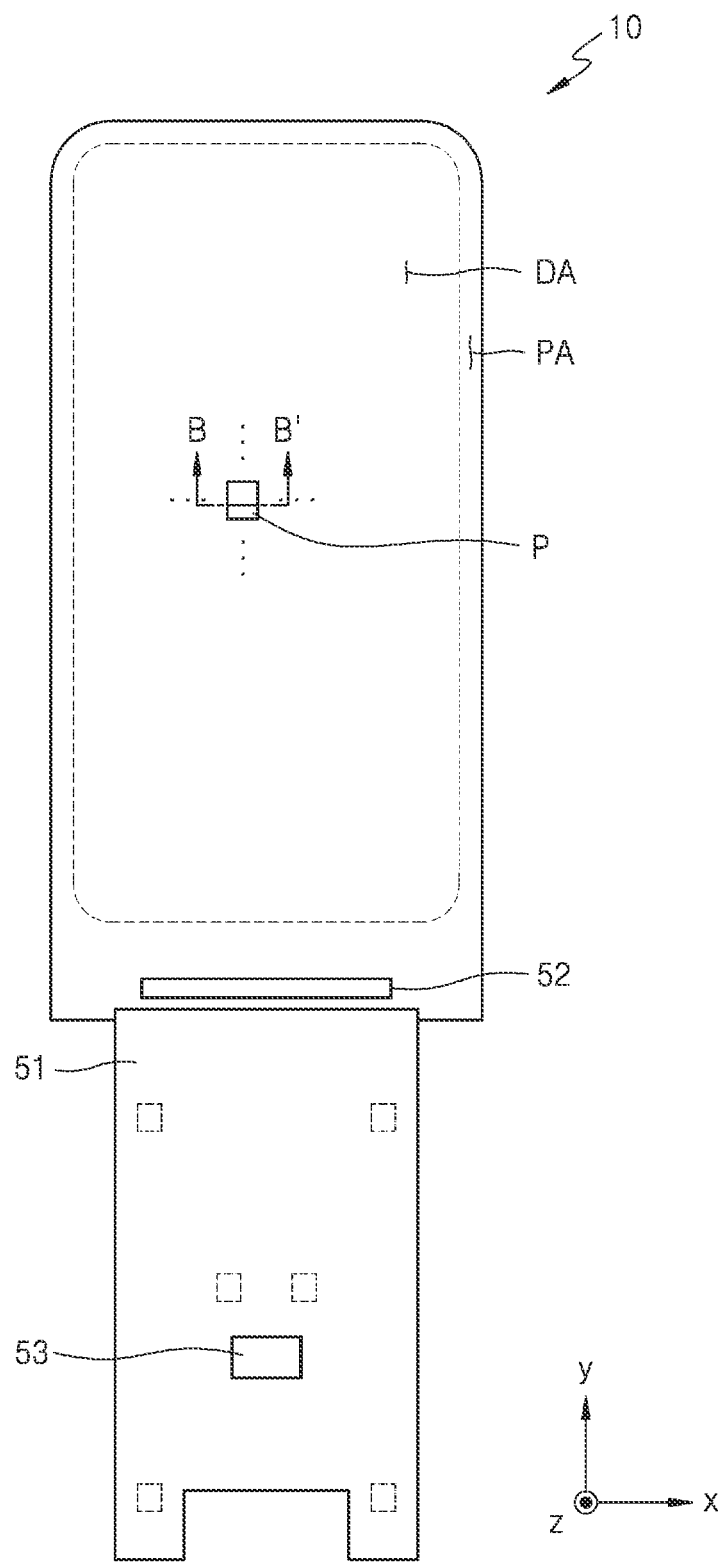
FIG. 7 is a plan view schematically illustrating a display panel of FIG. 1.
Figure 8:
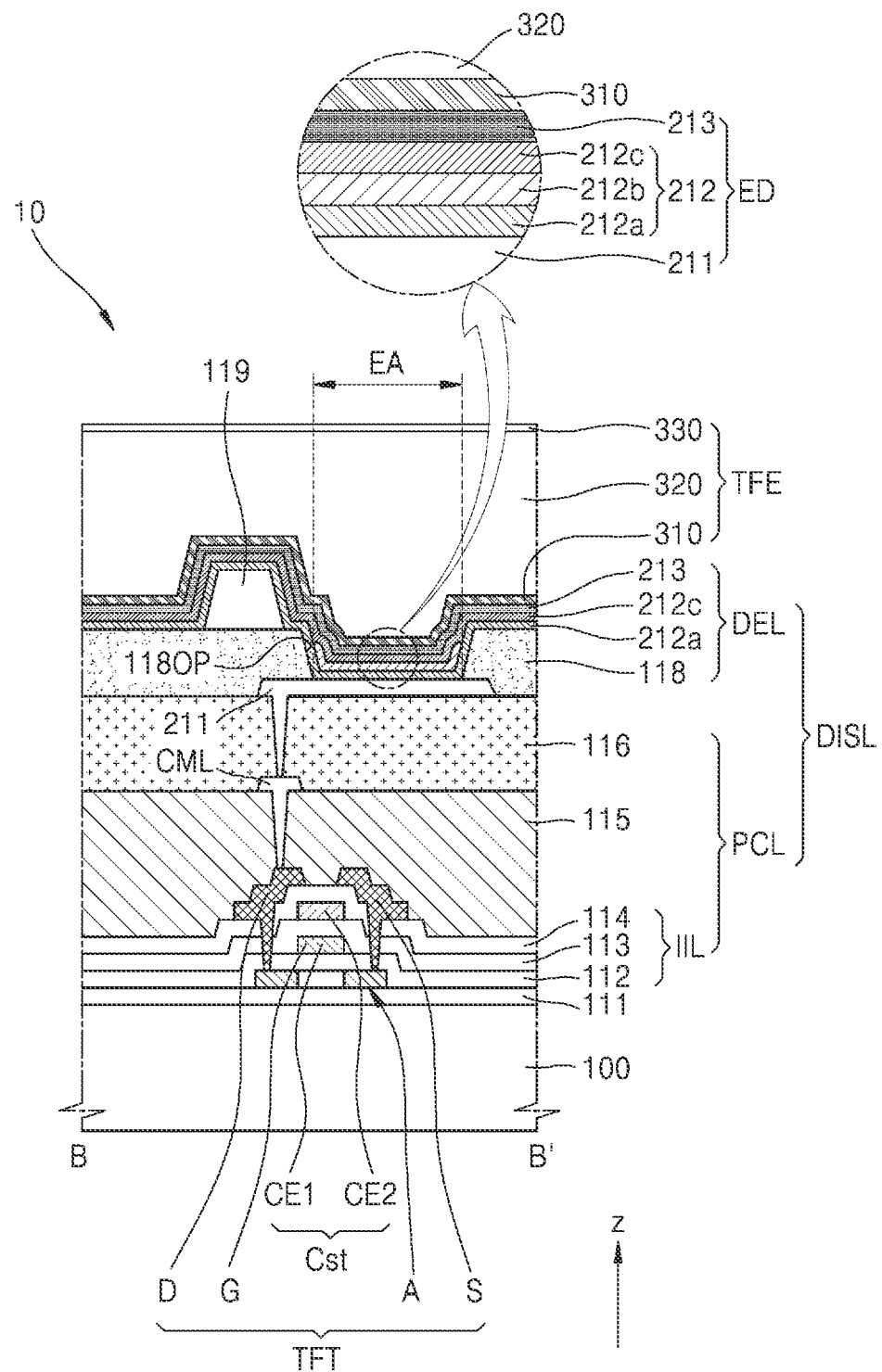
FIG. 8 is a cross-sectional view schematically illustrating a display panel of FIG. 7.

FIG. 7 is a plan view schematically illustrating a display panel of FIG. 1. FIG. 8 is a cross-sectional view schematically illustrating a display panel of FIG. 7. FIG. 8 is a cross-sectional view taken along line B-B' to schematically illustrate a pixel of FIG. 7.

With reference to FIGS. 7 and 8, further referring to FIG. 3, the display device 1 (see FIG. 1) may include the display panel 10, the display circuit board 51, the display driving portion 52, and the touch sensor driving portion 53. The display panel 10 may be a light-emitting display panel including a light-emitting element. For example, the display panel 10 may be an organic light-emitting display panel using an organic light-emitting diode (OLED) including an organic emission layer, a micro light-emitting diode (LED) display panel using a micro LED, a quantum dot light-emitting display panel using a quantum dot LED including a quantum dot emission layer, or an inorganic light-emitting display panel using an inorganic light-emitting element including an inorganic semiconductor.

The display panel 10 may be a transparent display panel that is transparent such that an object or a background on a lower surface of the display panel 10 may be viewed from an upper surface of the display panel 10. Alternatively, the display panel 10 may be a reflective display panel capable of reflecting an object or background on the upper surface of the display panel 10.

The display panel 10 may include a display area DA where an image is displayed and a peripheral area PA arranged around the display area DA. A driving circuit, a pad, etc. may be arranged in the peripheral area PA.

For example, the peripheral area PA may include a pad area (not shown). The pad area may protrude in −y direction from the peripheral area PA on one side of the display panel 10. The display driving portion 52 may be arranged in the pad area, and the display circuit board 51 may be connected to the pad area.

In an embodiment, the display panel 10 may include a bending area (not shown) to be bent. The bending area may be bent and may be arranged on the lower surface of the panel protecting layer PB. The pad area may overlap the peripheral area PA in the thickness direction (z direction) of the display panel 10. In this case, the pad area may be fixed to the panel protecting layer PB by a panel adhesive (not shown). The panel adhesive may be a PSA.

In another embodiment, the peripheral area PA may not include the bending area. In this case, the flexible film may be bent or the display circuit board 51 may be bent. The panel adhesive may be arranged as described above or similar to the description above.

In another embodiment, both of the display panel 10 and the display circuit board 51 may not be bent.

The display area DA may include a plurality of pixels P, which are display elements, and may display an image through the plurality of pixels P. Each of the plurality of pixels P may include subpixels. For example, each of the plurality of pixels P may include a red subpixel, a green subpixel, and a blue subpixel. Alternatively, each of the plurality of pixels P may include a red subpixel, a green subpixel, a blue subpixel, and a white subpixel.

The display circuit board 51 may be attached to an edge on one side of the display panel 10.

The display driving portion 52 may be arranged at various portions. For example, the display driving portion 52 may be arranged on the substrate 100 of the display panel 10. In another embodiment, the display driving portion 52 may be arranged on a flexible film. In another embodiment, the display driving portion 52 may be arranged on the display circuit board 51. Hereinafter, the embodiments are described focusing on the case where the display driving portion 52 is arranged on the substrate 100 for convenient explanation.

The display driving portion 52 may receive control signals and power voltages, and may generate signals and voltages for driving the display panel 10 and output the same. The display driving portion 52 may be formed as an integrated circuit (IC).

The display circuit board 51 may be attached to the display panel 10. The display circuit board 51 may be connected to the display panel 10 in various ways. In an embodiment, the display circuit board 51 may be attached to the display panel 10 by using a flexible film. In this case, the flexible film may be connected to the display panel 10 and the display circuit board 51 through an anisotropic conductive film. The display circuit board 51 may be a flexible printed circuit board (FPCB) which may be bent or a composite PCB including both of a FPCB and a rigid printed circuit board (PCB) which is hard and not easily bent.

In another embodiment, one side of the display circuit board 51 may be directly attached to an edge on one side of the display panel 10 by using an anisotropic conductive film. Hereinafter, the embodiments are described focusing on the case where the display panel 10 and the display circuit board 51 are connected to each other through the anisotropic conductive film for convenient explanation.

The touch sensor driving portion 53 may be arranged on the display circuit board 51. The touch sensor driving portion 53 may be formed as an integrated circuit. The touch sensor driving portion 53 may be attached onto the display circuit board 51. The touch sensor driving portion 53 may be electrically connected to touch electrode of the touch screen layer TSL of the display panel 10 through the display circuit board 51.

The touch screen layer TSL of the display panel 10 may sense a touch input of a user by using at least one of various touch methods such as a resistive film method, a capacitance method, etc. For example, when the touch screen layer TSL of the display panel 10 senses a touch input by a user by using the capacitance method, the touch sensor driving portion 53 may apply driving signals to driving electrodes among the touch electrodes. Then, whether the user has touched or not may be determined by sensing voltages charged in mutual capacitance between the driving electrodes and sensing electrodes, by using the sensing electrodes from among the touch electrodes. A touch by a user may include a contact touch and a proximity touch. A contact touch refers to a direct contact by a user's finger or an object such as a pen, on the cover arranged on the touch screen layer TSL Like hovering, a proximity touch refers to an approach by the finger of a user or an object such as a pen in proximity to the cover. The touch sensor driving portion 53 may transmit sensor data, for example, the detected voltages to the main processor, and by analyzing the sensor data, the main processor may calculate touch coordinates where a touch input has occurred.

The power supply portion for supplying driving voltages to drive the pixels P of the display panel 10, a scan driving portion, and the display driving portion 52 may be further arranged on the display circuit board 51. Alternatively, the power supply portion may be integrated with the display driving portion 52, and in this case, the display driving portion 52 and the power supply portion may be formed as a single IC.

The display panel 10 may include the substrate 100, the display layer DISL, the touch screen layer TSL, the functional layer OFL, and the panel protecting layer PB.

The display layer DISL may be arranged on the substrate 100. The display layer DISL may include pixels P and may be a layer displaying an image. The display layer DISL may include a circuit layer including thin film transistors, a display element layer in which display elements are arranged, and an encapsulation layer for encapsulating the display element layer.

The display layer DISL may include the display area DA and the peripheral area PA. The display area DA may be an area including the pixels P and displaying an image. The peripheral area PA may be arranged outside the display area DA and may be an area which does not display an image. The peripheral area PA may surround the display area DA. The peripheral area PA may be an area from the outer portion of the display area DA to the edge of the display panel 10. In the display area DA, not only the pixels P but also pixel circuits, scan lines connected to the pixel circuit, data lines, power lines, etc. may be arranged. In the peripheral area PA, a scan driving portion for applying scan signal to the scan lines, fan-out wires connecting the data lines to the display driving portion 52, etc. may be arranged.

The touch screen layer TSL may be arranged on the display layer DISL. The touch screen layer TSL may include touch electrodes and may be a layer to sense a user's touch. The touch screen layer TSL may be directly formed on the encapsulation layer of the display layer DISL. Alternatively, the touch screen layer TSL may be separately formed and then be coupled onto the encapsulation layer of the display layer DISL through an adhesive layer such as an OCA film.

The functional layer OFL may be arranged on the touch screen layer TSL. The functional layer OFL may include an anti-reflection layer. The anti-reflection layer may reduce reflectivity of light (external light) that is incident from an external source toward the display device 1. In some embodiments, the anti-reflection layer may include a polarization film. The polarization film may include a linear polarization plate and a phase delay film such as a quarter-wave ($\lambda/4$) plate. The phase delay film may be disposed on the touch screen layer TSL, and the linear polarization plate may be disposed on the phase delay film.

In some embodiments, the anti-reflection layer may include a filter layer including a black matrix and color filters. The color filters may be arranged considering the color of light emitted from each of the pixels P of the display device 1. For example, the filter layer may include a color filter of a red, green, or blue color.

In some embodiments, the anti-reflection layer may include a destructive interference structure. The destructive interference structure may include a first reflective layer and a second reflective layer arranged on different layers. First reflected light and second reflected light respectively reflected by the first reflective layer and the second reflective layer may undergo destructive interference, thereby reducing external light reflectance.

The cover 50 may be arranged on the functional layer OFL. The cover 50 may be attached onto the functional layer OFL by a transparent adhesive such as an OCA.

A panel protecting layer PB may be arranged below the display panel 10. The panel protecting layer PB may be attached onto the lower surface of the display panel 10 through an adhesive. The adhesive may include a pressure sensitive adhesive (PSA). The panel protecting layer PB may include at least one of a light absorption layer for absorbing light incident from the outside, a cushion layer for absorbing shock from the outside, and a heat dissipation layer for efficiently dissipating heat of the display panel 10.

The light absorption layer may be arranged under the display panel 10. The light absorption layer may blocks light transmission and thus prevent components arranged below a light absorption member, for example, the display circuit board 51, etc. from being viewed from above the display panel 10. The light absorption layer may include a light-absorbing material such as black pigment or black dye.

The cushion layer may be arranged under the light absorption member. The cushion layer may absorb an external impact to prevent the display panel 10 from being damaged. The cushion layer may have a single-layer structure or a multi-layer structure. For example, the cushion layer may include a polymer resin such as polyurethane, polycarbonate, polypropylene, and polyethylene, or an elastic material such as a sponge formed by foam-molding rubber, a urethane-based material, an acrylic-based material.

The heat dissipation layer may be arranged under the cushion layer. The heat dissipation layer include a first heat dissipation layer including graphite or carbon nanotubes, and a second heat dissipation layer including a metal thin film such as copper, nickel, ferrite, and silver that may shield electromagnetic waves and have excellent thermal conductivity.

The display panel 10 may include a substrate 100, a buffer layer 111, a display layer DISL, and a thin film encapsulation layer TFE. The display layer DISL may include a pixel circuit layer PCL and a display element layer DEL.

The substrate 100 may include a polymer resin such as polyether sulfone, polyarylate, polyether imide, polyethylene naphthalate, polyethylene terephthalate, polyphenylene sulfide, polyimide, polycarbonate, cellulose tri acetate, or cellulose acetate propionate. The substrate 100 including a polymer resin may be flexible, rollable, or bendable. The substrate 100 may have a multi-layer structure including a base layer including the polymer resin and a barrier layer (not shown).

The buffer layer 111 may include an inorganic insulating material such as silicon nitride, silicon oxynitride, or silicon oxide, and may be a layer or layers including the above inorganic insulating material(s).

The pixel circuit layer PCL may be arranged on the buffer layer 111. The pixel circuit layer PCL may include a thin film transistor TFT included in a pixel circuit, an inorganic insulating layer IIL, a first planarization layer 115, and a second planarization layer 116, which are arranged under and/or on components of the thin film transistor TFT. The inorganic insulating layer IIL may include a first gate insulating layer 112, a second gate insulating layer 113, and an interlayer insulating layer 114.

The thin film transistor TFT may include a semiconductor layer A, and the semiconductor layer A may include polysilicon. Alternatively, the semiconductor layer A may include amorphous silicon, an oxide semiconductor, or an organic semiconductor. The semiconductor layer A may include a drain area, a source area, and a channel area arranged between the drain area and the source area. A gate electrode G may overlap the channel area.

The gate electrode G may include a low-resistance metal material. The gate electrode G may include a conductive material including molybdenum (Mo), aluminum (Al), copper (Cu), titanium (Ti), etc. and may be a layer or layers including the above material(s).

The first gate insulating layer 112 disposed between the semiconductor layer A and the gate electrode G may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_x$), etc. The zinc oxide ($ZnO_x$) may be ZnO and/or $ZnO_2$.

The second gate insulating layer 113 may cover the gate electrode G. Similar to the first gate insulating layer 112, the second gate insulating layer 113 may include an inorganic insulating material such as silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), zinc oxide ($ZnO_x$), etc. The zinc oxide ($ZnO_x$) may be ZnO and/or $ZnO_2$.

An upper electrode CE2 of a storage capacitor Cst may be arranged on the second gate insulating layer 113. The upper electrode CE2 may overlap the gate electrode G disposed thereunder. In this case, the gate electrode G and the upper electrode CE2, which overlap each other with the second gate insulating layer 113 disposed therebetween, may form the storage capacitor Cst. That is, the gate electrode G may function as a lower electrode CE1 of the storage capacitor Cst. As such, the storage capacitor Cst and the thin film transistor TFT may overlap. In some embodiments, the storage capacitor Cst may not overlap the thin film transistor TFT.

The upper electrode CE2 may include aluminum (Al), platinum (Pt), palladium (Pd), silver (Ag), magnesium (Mg), gold (Au), nickel (Ni), neodymium (Nd), iridium (Ir), chromium (Cr), calcium (Ca), molybdenum (Mo), titanium (Ti), tungsten (W), and/or copper (Cu), and may include a single layer or multiple layers including the above-described material.

The interlayer insulating layer 114 may cover the upper electrode CE2. The interlayer insulating layer 114 may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), or zinc oxide ($ZnO_x$). The zinc oxide ($ZnO_x$) may be ZnO and/or $ZnO_2$. The interlayer insulating layer 114 may include a single layer or a multi-layer including the above inorganic insulating material.

A drain electrode D and a source electrode S may each be arranged on the interlayer insulating layer 114. The drain electrode D and the source electrode S may include materials having good conductivity. The drain electrode D and the source electrode S may include conductive materials such as Mo, Al, Cu, and/or Ti and may be layers or a layer including the above material(s). In an embodiment, the drain electrode D and the source electrode S may have a multi-layered structure of Ti/Al/Ti.

The first planarization layer 115 may cover the drain electrode D and the source electrode S. The first planarization layer 115 may include an organic insulating layer. The first planarization layer 115 may include organic insulating materials such as a general-purpose polymer such as polystyrene (PS), polymethylmethacrylate (PMMA), a polymer derivative having a phenol-based group, an acrylic-based polymer, an imide-based polymer, an arylether-based polymer, an amide-based polymer, a fluorine-based polymer, a p-xylene-based polymer, a vinyl alcohol-based polymer, and a blend thereof.

A connection electrode CML may be arranged on the first planarization layer 115. The connection electrode CML may be connected to the drain electrode D or the source electrode S through a contact hole formed through the first planarization layer 115. The connection electrode CML may include materials having good conductivity. The connection electrode CML may include a conductive material including molybdenum (Mo), aluminum (Al), copper (Cu), titanium (Ti), etc. and may have a single or multi-layer structure including the conductive material. In an embodiment, the connection electrode CML may have a multi-layered structure of Ti/Al/Ti.

The second planarization layer 116 may cover the connection electrode CML. The second planarization layer 116 may include an organic insulating layer. The second planarization layer 116 may include organic insulating materials such as a general-purpose polymer such as polystyrene (PS), polymethylmethacrylate (PMMA), a polymer derivative having a phenol-based group, an acrylic-based polymer, an imide-based polymer, an arylether-based polymer, an amide-based polymer, a fluorine-based polymer, a p-xylene-based polymer, a vinyl alcohol-based polymer, and a blend thereof.

The display element layer DEL may be arranged on the pixel circuit layer PCL. The display element layer DEL may include a display element ED. The display element ED may be an OLED. A pixel electrode 211 of the display element ED may be electrically connected to the connection electrode CML through a contact hole formed through the second planarization layer 116.

The pixel electrode 211 may include conductive oxide such as indium tin oxide (ITO), indium zinc oxide (IZO), zinc oxide (ZnO), indium oxide ($In_2O_3$), indium gallium oxide (IGO), or aluminum zinc oxide (AZO). In another embodiment, the pixel electrode 211 may include a reflective film including silver (Ag), magnesium (Mg), aluminum (Al), platinum (Pt), palladium (Pd), gold (Au), nickel (Ni), neodymium (Nd), iridium (Jr), chrome (Cr), or a compound thereof. In another embodiment, the pixel electrode 211 may further include a film including ITO, IZO, ZnO, or $In_2O_3$ on/under the reflective film.

On the pixel electrode 211, a pixel definition film 118 having the opening 118OP exposing a central portion of the pixel electrode 211 may be arranged. The pixel definition film 118 may include an organic insulating material and/or an inorganic insulating material. The opening 118OP may define an emission area of light (hereinafter, referred to as the emission area EA) emitted from the display element ED. For example, a width of the opening 118OP may correspond to a width of the emission area EA of the display element ED.

A spacer 119 may be arranged on the pixel definition film 118. The spacer 119 may be provided to prevent damage of the substrate 100 in a method of manufacturing a display device. When manufacturing a display panel, a mask sheet may be used. The spacer 119 may prevent damage to the substrate by preventing the mask sheet from contacting the layer exposed by the opening 118OP of the pixel definition film 118 or the pixel definition film 118 during deposition of a deposition material on the substrate 100.

The spacer 119 may include an organic insulating material such as polyimide. Alternatively, the spacer 119 may include an inorganic insulating material such as silicon nitride or silicon oxide, or include an organic insulating material and an inorganic insulating material.

In an embodiment, the spacer 119 may include a material different from that of the pixel definition film 118. In another embodiment, the spacer 119 and the pixel definition film 118 may include the same material, and in this case, the pixel definition film 118 and the spacer 119 may be formed together in a mask process using a halftone mask, etc.

An intermediate layer 212 may be arranged on the pixel definition film 118. The intermediate layer 212 may include an emission layer 212b arranged at the opening 118OP of the pixel definition film 118. The emission layer 212b may include a high molecular weight organic material or a low molecular weight organic material emitting light of a certain color.

A first functional layer 212a and a second functional layer 212c may be respectively located under and over the emission layer 212b. The first functional layer 212a may include, for example, a hole transport layer (HTL) or include an HTL and a hole injection layer (HIL). The second functional layer 212c may be a component arranged on the emission layer 212b and may be optional. The second functional layer 212c may include an electron transport layer (ETL) and/or an electron injection layer (EIL). The first functional layer 212a and/or the second functional layer 212c may be common layers that entirely cover the substrate 100.

The opposite electrode 213 may include a conductive material having a low work function. For example, the opposite electrode 213 may include a (semi-)transparent layer including silver (Ag), magnesium (Mg), aluminum (Al), platinum (Pt), palladium (Pd), gold (Au), nickel (Ni), neodymium (Nd), iridium (Jr), chromium (Cr), lithium (Li), calcium (Ca), or an alloy thereof. Alternatively, the opposite electrode 213 may further include a layer such as ITO, IZO, ZnO, or $In_2O_3$ on the (semi-)transparent layer including the above-described material.

In an embodiment, a capping layer (not shown) may be further arranged on the opposite electrode 213. The capping layer may include LiF, an inorganic material, and/or an organic material.

The thin film encapsulation layer TFE may be arranged on the opposite electrode 213. In an embodiment, the thin film encapsulation layer TFE may include at least one inorganic encapsulation layer and at least one organic encapsulation layer, and FIG. 8 shows that the thin film encapsulation layer TFE includes a first inorganic encapsulation layer 310, an organic encapsulation layer 320, and a second inorganic encapsulation layer 330 that are sequentially stacked.

The first inorganic encapsulation layer 310 and the second inorganic encapsulation layer 330 may include at least one inorganic material of an aluminum oxide, a titanium oxide, a tantalum oxide, a hafnium oxide, a zinc oxide, a silicon oxide, a silicon nitride, and a silicon oxynitride. The organic encapsulation layer 320 may include a polymer-based material. Examples of the polymer-based material may include an acrylic resin, an epoxy resin, polyimide, polyethylene, etc. In an embodiment, the organic encapsulation layer 320 may include acrylate.

Figure 9A:
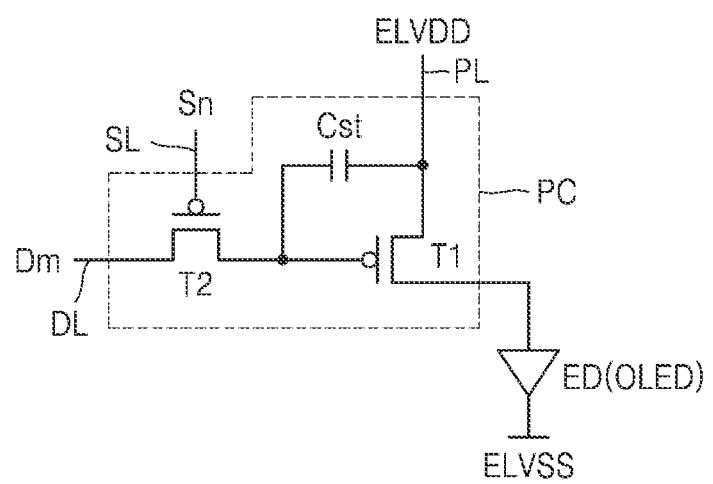
FIGS. 9A and 9B are circuit diagrams schematically illustrating a circuit of a display panel of FIG. 7.
Figure 9B:
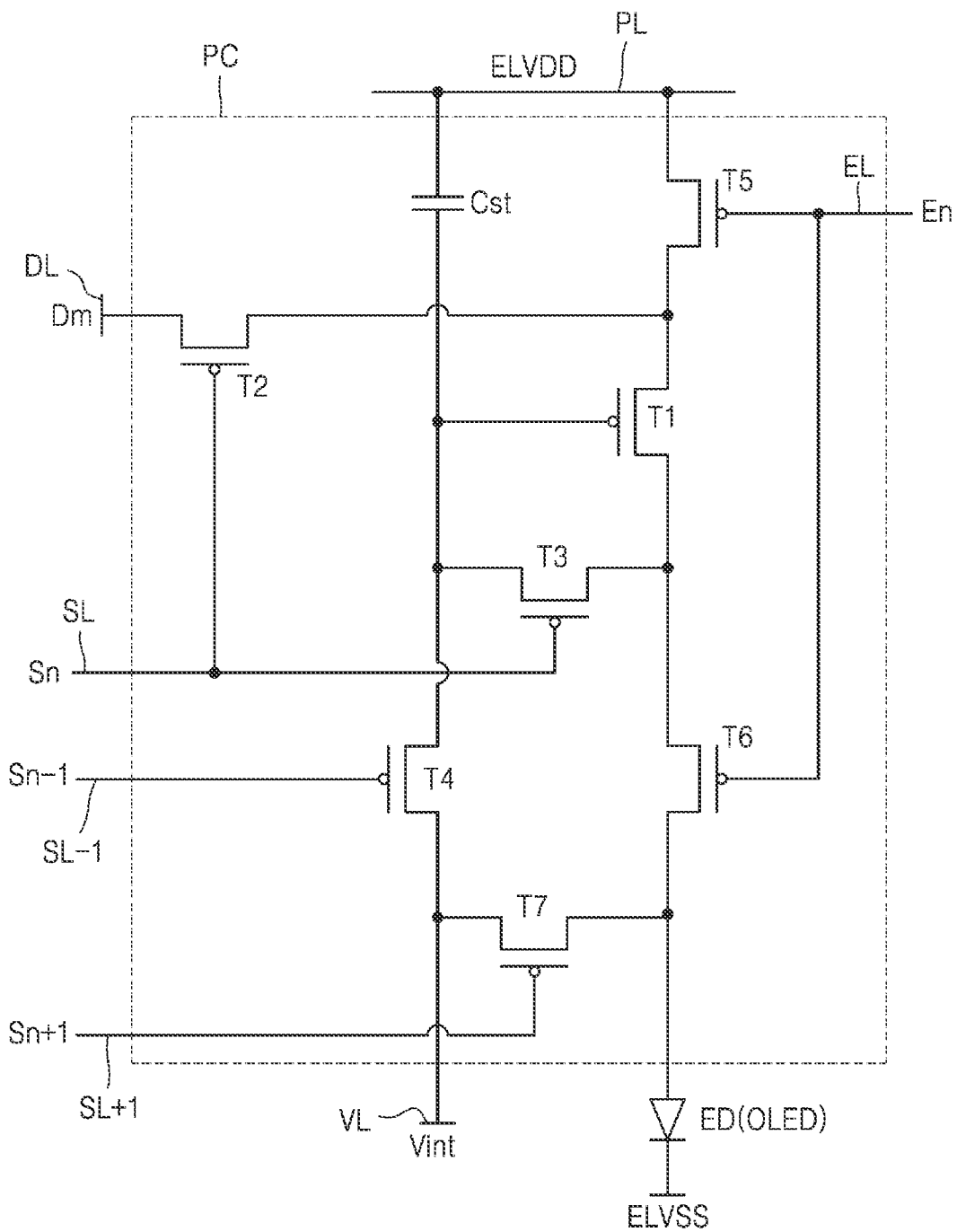

FIGS. 9A and 9B are circuit diagrams schematically illustrating a circuit of a display panel of FIG. 7.

With reference to FIG. 9A, a pixel circuit PC may be connected to the display element ED and implement light emission of subpixels. The pixel circuit PC may include a driving thin film transistor T1, a switching thin film transistor T2, and a storage capacitor Cst. The switching thin film transistor T2 may be connected to a scan line SL and a data line DL and may transfer a data signal Dm input from the data line DL to the driving thin film transistor T1 in response to a scan signal Sn input from the scan line SL.

The storage capacitor Cst may be connected between the switching thin film transistor T2 and a driving voltage line PL and may store a voltage corresponding to the difference between a voltage received from the switching thin film transistor T2 and a driving voltage ELVDD supplied to the driving voltage line PL.

The driving thin film transistor T1 may be connected between the driving voltage line PL and the display element ED and control a driving current flowing from the driving voltage line PL through the display element ED in correspondence to a voltage value stored in the storage capacitor Cst. The display element ED may emit light having a certain brightness by the driving current.

Though FIG. 9A describes the case where the pixel circuit PC includes two thin film transistors and one storage capacitor, the disclosure is not limited thereto.

Referring to FIG. 9B, the pixel circuit PC may include the driving thin film transistor T1, the switching thin film transistor T2, a compensation thin film transistor T3, a first initialization thin film transistor T4, an operation control thin film transistor T5, an emission control thin film transistor T6, and a second initialization thin film transistor T7.

Although FIG. 9B illustrates that each pixel circuit PC includes signal lines SL, SL−1, SL+1, EL, and DL, an initialization voltage line VL, and a driving voltage line PL, the disclosure is not limited thereto. In another embodiment, at least one of the signal lines (e.g., the scan line SL, the previous scan line SL−1, the next scan line SL+1, the emission control line EL, and the data line DL) and the initialization voltage line VL may be shared by neighboring pixel circuits.

A drain electrode of the driving thin film transistor T1 may be electrically connected to the display element ED via the emission control thin film transistor T6. The driving thin film transistor T1 may receive the data signal Dm according to a switching operation of the switching thin film transistor T2 and supply the driving current to the display element ED.

A gate electrode of the switching thin film transistor T2 may be connected to the scan line SL, and a source electrode of the switching thin film transistor T2 may be connected to the data line DL. A drain electrode of the switching thin film transistor T2 may be connected to a source electrode of the driving thin film transistor T1 and may be connected to the driving voltage line PL via the operation control thin film transistor T5.

The switching thin film transistor T2 may be turned on in response to a scan signal Sn transmitted through the scan line SL and perform a switching operation of transmitting a data signal Dm transmitted through the data line DL to the source electrode of the driving thin film transistor T1.

A gate electrode of the compensation thin film transistor T3 may be connected to the scan line SL. A source electrode of the compensation thin film transistor T3 may be connected to the drain electrode of the driving thin film transistor T1 and may be connected to a pixel electrode of the display element ED via the emission control thin film transistor T6. A drain electrode of the compensation thin film transistor T3 may be connected to any one electrode of the storage capacitor Cst, a source electrode of the first initialization thin film transistor T4, and a gate electrode of the driving thin film transistor T1. The compensation thin film transistor T3 may be turned on in response to a scan signal Sn transmitted through the scan line SL and diode-connect the driving thin film transistor T1 by connecting the gate electrode of the driving thin film transistor T1 to the drain electrode of the driving thin film transistor T1.

A gate electrode of the first initialization thin film transistor T4 may be connected to a previous scan line SL−1. A drain electrode of the first initialization thin film transistor T4 may be connected to the initialization voltage line VL. The source electrode of the first initialization thin film transistor T4 may be connected to any one electrode of the storage capacitor Cst, the drain electrode of the compensation thin film transistor T3, and the gate electrode of the driving thin film transistor T1. The first initialization thin film transistor T4 may be turned on in response to a previous scan signal Sn−1 transmitted through the previous scan line SL−1 and perform an initialization operation of initializing a voltage of the gate electrode of the driving thin film transistor T1 by transmitting an initialization voltage Vint to the gate electrode of the driving thin film transistor T1.

A gate electrode of the operation control thin film transistor T5 may be connected to an emission control line EL. A source electrode of the operation control thin film transistor T5 may be connected to the driving voltage line PL. A drain electrode of the operation control thin film transistor T5 may be connected to the source electrode of the driving thin film transistor T1 and the drain electrode of the switching thin film transistor T2.

A gate electrode of the emission control thin film transistor T6 may be connected to the emission control line EL. A source electrode of the emission control thin film transistor T6 may be connected to the drain electrode of the driving thin film transistor T1 and the source electrode of the compensation thin film transistor T3. A drain electrode of the emission control thin film transistor T6 may be electrically connected to the pixel electrode of the display element ED. The operation control thin film transistor T5 and the emission control thin film transistor T6 may be simultaneously turned on in response to an emission control signal En received through the emission control line EL, and the driving voltage ELVDD may be transmitted to the display element ED such that the driving current flows in the display element ED.

A gate electrode of the second initialization thin film transistor T7 may be connected to a next scan line SL+1. A source electrode of the second initialization thin film transistor T7 may be connected to the pixel electrode of the display element ED. A drain electrode of the second initialization thin film transistor T7 may be connected to the initialization voltage line VL. The second initialization thin film transistor T7 may be turned on in response to a next scan signal Sn+1 received through the next scan line SL+1 and may initialize the pixel electrode of the display element ED.

Although FIG. 9B illustrates a case in which the first initialization thin film transistor T4 and the second initialization thin film transistor T7 are connected to the previous scan line SL−1 and the next scan line SL+1, respectively, the disclosure is not limited thereto. In another embodiment, the first initialization thin film transistor T4 and the second initialization thin film transistor T7 may be both connected to a previous scan line SL−1 and driven according to the previous scan signal Sn−1.

The other electrode of the storage capacitor Cst may be connected to the driving voltage line PL. Any one electrode of the storage capacitor Cst may be connected to all of the gate electrode of the driving thin film transistor T1, the drain electrode of the compensation thin film transistor T3, and the source electrode of the first initialization thin film transistor T4.

An opposite electrode (for example, a cathode) of the display element ED may receive a common voltage ELVSS. The display element ED may receive a driving current from the driving thin film transistor T1 and emit light.

The pixel circuit PC is not limited to the number and circuit design of the thin film transistors and the storage capacitor described with reference to FIGS. 9A and 9B, and the number and the circuit design thereof may be variously changed.

The display device according to the embodiments of the disclosure may reduce damage to the display panel and the cover window. In addition, the display device according to the embodiments of the disclosure may provide a clear image and have longer lifespan.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the attached claims.

What is claimed is:

1. A display device comprising:
   a display panel including a substrate and a display layer on a first surface of the substrate;
   a first cover arranged on the first surface of the substrate;
   a display circuit board connected to the first surface of the substrate and having at least portion disposed on a second surface of the substrate that opposes the first surface of the substrate; and
   a gasket arranged on a surface of the display circuit board on the second surface of the substrate,
   wherein the gasket comprises a signal input portion which include a plurality of terminal portions, a length of one terminal portion of the plurality of terminal portions being different from a length of another terminal portion of the plurality of terminal portions, and
   wherein the display circuit board comprises a sensor configured to sense a signal which varies according to a distance between the signal input portion and the sensor.

2. The display device of claim 1, wherein the display circuit board is bent.

3. The display device of claim 1, wherein the signal input portion further comprises:
   a connection portion to which the plurality of terminal portions are connected.

4. The display device of claim 3, wherein the plurality of terminal portions extend vertically with respect to a surface of the connection portion.

5. The display device of claim 3, wherein the plurality of terminal portions comprise three or more terminal portions, and
   wherein the three or more terminal portions are arranged radially with respect to one of the three or more terminal portions.

6. The display device of claim 1, wherein the sensor comprises:
   a first wire; and
   a second wire arranged to intersect the first wire.

7. The display device of claim 6, wherein at least one of the first wire and the second wire comprises a plurality of wires, and
   wherein the first wire and the second wire intersect at a plurality of areas.

8. The display device of claim 1, wherein the display device further comprises a panel protection layer arranged between the display panel and the display circuit board.

9. The display device of claim 1, wherein the display device further comprises a bracket coupled to the display panel.

10. A display device comprising:
    a bracket;
    a display panel coupled to the bracket and comprising a substrate and a display layer arranged on a front surface of the substrate;
    a display circuit board connected to the front surface of the substrate and having at least portion arranged on a rear surface of the substrate that opposes the front surface of the substrate; and
    a gasket arranged between the display circuit board on the rear surface of the substrate and the bracket,
    wherein the display circuit board comprises a sensor configured to sense a signal that varies according to a height of the gasket, and
    wherein the gasket comprises:
    a gasket body portion;
    a connection portion arranged on a surface of the gasket body portion; and
    a terminal portion inserted into the gasket body portion and connected to the connection portion.

11. The display device of claim 10, further comprising a cover arranged on the display panel.

12. The display device of claim 11, wherein, in a plan view, an edge of the cover is arranged outside of an edge of the display layer.

13. The display device of claim 10, wherein the terminal portion comprises a plurality of terminal portions, and
    wherein a length of one terminal portion of the plurality of terminal portions is different from a length of another terminal portion of the plurality of terminal portions.

14. The display device of claim 10, wherein the terminal portion extends in a vertical direction from the connection portion.

15. The display device of claim 10, wherein the sensor comprises:
    a first wire; and
    a second wire arranged to intersect the first wire.

16. The display device of claim 15, wherein each of the first wire and the second wire comprises a plurality of wires, and
    wherein intersections between the first wire and the second wire are arranged to be spaced apart from each other.

17. The display device of claim 15, wherein the first wire and the second wire are electrically insulated from each other.

18. The display device of claim 10, wherein the display device further comprises a panel protection layer arranged between the substrate and the display circuit board.

* * * * *